(12) United States Patent
Matsumura et al.

(10) Patent No.: US 9,685,658 B2
(45) Date of Patent: Jun. 20, 2017

(54) COMPOSITE PARTICLES FOR ELECTROCHEMICAL DEVICE ELECTRODE, MATERIAL FOR ELECTROCHEMICAL DEVICE ELECTRODE, AND ELECTROCHEMICAL DEVICE ELECTRODE

(75) Inventors: Taku Matsumura, Tokyo (JP); Yuko Otani, Tokyo (JP)

(73) Assignee: Zeon Corporation, Tokyo (JP)

( * ) Notice: Subject to any disclaimer, the term of this patent is extended or adjusted under 35 U.S.C. 154(b) by 313 days.

(21) Appl. No.: 14/232,838

(22) PCT Filed: Jul. 13, 2012

(86) PCT No.: PCT/JP2012/067907
§ 371 (c)(1),
(2), (4) Date: Jan. 14, 2014

(87) PCT Pub. No.: WO2013/011936
PCT Pub. Date: Jan. 24, 2013

(65) Prior Publication Data
US 2014/0170486 A1     Jun. 19, 2014

(30) Foreign Application Priority Data

Jul. 15, 2011 (JP) ................. 2011-156554
Jul. 20, 2011 (JP) ................. 2011-158966
Aug. 5, 2011 (JP) ................. 2011-171614

(51) Int. Cl.
| | |
|---|---|
| *H01M 4/36* | (2006.01) |
| *H01M 4/13* | (2010.01) |
| *H01M 4/139* | (2010.01) |
| *H01M 4/62* | (2006.01) |
| *H01M 4/04* | (2006.01) |
| *H01M 4/525* | (2010.01) |
| *H01M 4/587* | (2010.01) |

(52) U.S. Cl.
CPC ......... *H01M 4/362* (2013.01); *H01M 4/0419* (2013.01); *H01M 4/0435* (2013.01); *H01M 4/13* (2013.01); *H01M 4/139* (2013.01); *H01M 4/622* (2013.01); *H01M 4/525* (2013.01); *H01M 4/587* (2013.01); *Y02P 70/54* (2015.11)

(58) Field of Classification Search
CPC ............................ H01M 4/362; H01M 4/0419
USPC ............................ 429/211; 252/182.1; 264/5
See application file for complete search history.

(56) References Cited

U.S. PATENT DOCUMENTS

| | | |
|---|---|---|
| 2005/0058907 A1 | 3/2005 | Kurihara et al. |
| 2005/0064289 A1 | 3/2005 | Suzuki et al. |
| 2005/0130040 A1 | 6/2005 | Yang et al. |
| 2007/0003836 A1 | 1/2007 | Suzuki et al. |
| 2010/0276217 A1* | 11/2010 | Sugaya et al. ............... 180/65.1 |

FOREIGN PATENT DOCUMENTS

| | | |
|---|---|---|
| JP | 9-219190 A | 8/1997 |
| JP | 4219705 B2 | 2/2000 |
| JP | 2004-247249 A | 9/2004 |
| JP | 2005-150117 A | 6/2005 |
| JP | 2005-190831 A | 7/2005 |
| JP | 2008-251965 A | 10/2008 |
| JP | 2009-4222 A | 1/2009 |
| JP | 2010-92601 A | 4/2010 |
| JP | 2010-98166 A | 4/2010 |
| JP | 2010-108971 A | 5/2010 |
| JP | 2010-109354 A | 5/2010 |
| JP | 2011-108467 A | 6/2011 |
| WO | WO 2011/024789 A1 | 3/2011 |

OTHER PUBLICATIONS

Ohata. JP 4219705. Sep. 2, 2004. English machine translation by JPO.*
PCT/ISA/210—International Search Report mailed on Sep. 4, 2012, issued in PCT/JP2012/067907.

* cited by examiner

*Primary Examiner* — James Lee
(74) *Attorney, Agent, or Firm* — Birch, Stewart, Kolasch & Birch, LLP

(57) ABSTRACT

Composite particles for electrochemical device electrode which contain an electrode active material, a non-water soluble particle-shaped polymer, and a water-soluble polymer having a sulfonic acid group are provided. According to the present invention, composite particles for electrochemical device electrode are high in fluidity, exhibit high adhesion with a current collector, and can provide an electrochemical device electrode which is high in initial capacity, low in internal resistance, an excellent in high temperature storage characteristics are provided.

13 Claims, No Drawings

COMPOSITE PARTICLES FOR ELECTROCHEMICAL DEVICE ELECTRODE, MATERIAL FOR ELECTROCHEMICAL DEVICE ELECTRODE, AND ELECTROCHEMICAL DEVICE ELECTRODE

TECHNICAL FIELD

The present invention relates to composite particles for electrochemical device electrode, a material for electrochemical device electrode, and an electrochemical device electrode.

BACKGROUND ART

Small-sized, light weight, high energy density and repeatedly chargeable and dischargeable lithium ion secondary cells and other electrochemical devices are rapidly growing in demand due to their properties. Lithium ion secondary cells are relatively large in energy density, so are being utilized in mobile phones, notebook personal computers, electric vehicles, and other fields.

These electrochemical devices are being required to be made lower in resistance, higher in capacity, better in mechanical properties and productivity, and otherwise improved more along with the expansion and growth in applications. In view of this situation, higher productivity methods of production are being sought for electrochemical device electrodes as well. Various improvements are being made to methods of production enabling high speed shaping and materials for electrochemical device electrode which are suitable with the methods of production.

Electrochemical device electrodes are usually formed by laminating an electrode active material layer formed by bonding an electrode active material and a conductive material which is used in accordance with need which by a binder on a current collector. As a method for forming such an electrode active material layer, Patent Documents 1 and 2 disclose a method of spray drying a slurry which contains an electrode active material, rubber particles, and dispersant to obtain a particle-shaped electrode material and using the obtained electrode material to form an electrode active material layer.

However, in the art described in Patent Document 1, when preparing a slurry, no viscosity adjuster is used, so the viscosity of the slurry is low, the binder ends up concentrating locally at the surface in the particle-shaped electrode material, the obtained particle-shaped electrode material becomes inferior in fluidity, and therefore an electrode which has a uniform film thickness cannot be fabricated. Further, in the art described in Patent Document 2, carboxymethylcellulose is used as a viscosity adjuster which acts also as a dispersant, but carboxymethylcellulose bonds with the binder in the particle-shaped electrode material. Due to this, the binder ends up becoming hard and the adhesion with the current collector sometimes becomes insufficient when press-forming the obtained particle-shaped electrode material.

Further, development work is proceeding on the active material for positive electrode for the purpose of raising the performance of lithium ion secondary cells. Attention is focusing on an active material for positive electrode which contains nickel or another transition metal for the purpose of raising the capacity. Such an active material for positive electrode for raising the capacity exhibits a strong basicity due to the lithium carbonate which was used at the time of production of the active material remaining in the active material. For this reason, as in the art described in Patent Documents 1 and 2, when using the active material for positive electrode to obtain an aqueous slurry and spray drying the obtained aqueous slurry, the strong basicity causes the spray drying apparatus and other production equipment to end up corroding. Due to this, the aqueous slurry ends up being contaminated by foreign matter. When making an electrode, there were the problems that the cycle characteristics and other cell characteristics ended up falling.

PRIOR ART DOCUMENTS

Patent Documents

Patent Document 1: Japanese Patent No. 4219705
Patent Document 2: Japanese Patent Publication No. 2010-109354A

SUMMARY OF THE INVENTION

Problem to be Solved by the Invention

The present invention has as its object the provision of composite particles for electrochemical device electrode which are high in fluidity, exhibit high adhesion with a current collector, and can give an electrochemical device electrode which has a low internal resistance and has an excellent high temperature storage characteristics. Further, the present invention has as its object the provision of a material for electrochemical device electrode and an electrochemical device electrode which are obtained by using such composite particles for electrochemical device electrode.

Means for Solving the Problems

The inventors engaged in in-depth research so as to achieve the above object and as a result discovered that composite particles which contain an electrode active material, a non-water soluble particle-shaped polymer, and a water-soluble polymer having a sulfonic acid group exhibit a high adhesion to a current collector and, when made into an electrode, gives a low internal resistance and excellent high temperature storage characteristics and thereby completed the present invention.

That is, according to the present invention, there are provided composite particles for electrochemical device electrode containing an electrode active material, a non-water soluble particle-shaped polymer, and a water-soluble polymer having a sulfonic acid group.

In the composite particles for electrochemical device electrode of the present invention, the water-soluble polymer further contains monomer units which contain carboxyl groups.

In the composite particles for electrochemical device electrode of the present invention, the particles can be configured so that the electrode active material is a positive electrode active material which contains nickel.

In the composite particles for electrochemical device electrode of the present invention, the particles can be configured so that the electrode active material is a flake-shaped electrode active material.

In the composite particles for electrochemical device electrode of the present invention, preferably the water-soluble polymer is a water-soluble polymer having monomer units which contain sulfonic acid groups and a ratio of content of the monomer units which contain sulfonic acid groups in the water-soluble polymer is 2 to 15 wt %.

In the composite particles for electrochemical device electrode of the present invention, preferably a ratio of content of the monomer units which contain carboxyl groups in the water-soluble polymer is 20 to 60 wt %.

In the composite particles for electrochemical device electrode of the present invention, preferably the water-soluble polymer further contains (meth)acrylic acid ester monomer units.

According to the present invention, there is provided a material for electrochemical device electrode including any of the above composite particles for electrochemical device electrode.

Further, according to the present invention, there is provided an electrochemical device electrode comprising an electrode active material layer which is formed by using the above material for electrochemical device electrode laminated on a current collector.

The electrochemical device electrode of the present invention is preferably one in which the electrode active material layer is laminated on the current collector by press forming, more preferably is one laminated on the current collector by roll press forming.

Furthermore, according to the present invention, there is provided a method of production of any of the above composite particles for electrochemical device electrode comprising a step of making the electrode active material, the non-water soluble particle-shaped polymer, and the water-soluble polymer disperse in water to obtain a slurry and a step of spraying and drying the slurry to form granules.

Effects of the Invention

According to the present invention, it is possible to provide composite particles for electrochemical device electrode which exhibit high adhesion with a current collector and can give an electrochemical device electrode which has a low internal resistance and has an excellent high temperature storage characteristics and a material for electrochemical device electrode and an electrochemical device electrode which are obtained by using such composite particles for electrochemical device electrode.

DESCRIPTION OF EMBODIMENTS

The composite particles for electrochemical device electrode of the present invention contains an electrode active material, a non-water soluble particle-shaped polymer, and a water-soluble polymer having a sulfonic acid group.

(Electrode Active Material)

The electrode active material used in the present invention is not particularly limited, but, for example, as the electrode active material for positive electrode, a compound which contains a transition metal, specifically, an oxide which contains a transition metal or a composite oxide of lithium and a transition metal, can be used. As an example of such a transition metal, cobalt, manganese, nickel, iron, etc. may be mentioned, but in the present invention, a compound which contains nickel, in particular, an oxide which contains nickel, a composite oxide which contains lithium and nickel, etc. can be used. Among these, a composite oxide which contains lithium and nickel is preferable. These are preferable since they are higher in capacity compared with the lithium cobalt oxide ($LiCoO_2$) which has been used as a positive electrode active material of a lithium-based secondary cell in the past. As a composite oxide which contains lithium and nickel, for example, one of the following general formula may be mentioned.

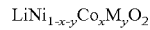

$LiNi_{1-x-y}Co_xM_yO_2$ (where, $0 \leq x < 1$, $0 \leq y < 1$, $x+y < 1$, and M is at least one element selected from B, Mn, and Al)

Further, as the electrode active material for negative electrode, for example, amorphous carbon, graphite, natural graphite, artificial graphite, mesocarbon microbeads, pitch-based carbon fiber, and other carbonaceous materials; polyacene or other conductive polymers; silicon, tin, zinc, manganese, iron, nickel, or other metals and their alloys; oxides or sulfides of the metals or alloys; lithium transition metal nitrides; silicon; SiOC, TiOC, AlOC, $Al_2O_3$, $ZrO_2$, $TiO_2$, or other ceramics; etc. may be used. Among these, from the viewpoint of a good balance between the capacity and cycle characteristics, graphite, natural graphite, artificial graphite, mesocarbon microbeads, or other graphite-based material is preferable, while from the viewpoint of the ability to raise the capacity, joint use of a graphite-based material and SiOC is particularly preferable.

Alternatively, as the electrode active material, a flake-shaped electrode active material may also be used. The flake-shaped electrode active material is not particularly limited so long as having a flake shape, but, for example, one which has a length of the long axis L1 of 0.1 to 20 μm, preferably 0.5 to 10 μm, and a ratio of the length of the short axis L2 and thickness "t" (L2/t) of 10 or more, preferably 15 or more, is preferably used. Further, the ratio (L1/L2) of the length of the long axis L1 and the length of the short axis L2 is not particularly limited, but is preferably 1 to 5, more preferably 1 to 2. Note that, the long axis L1 is, for example, the length of the longest axis on the major surface of the electrode active material and, further, the short axis L2 is, for example, the length of the shortest axis on the major surface of the electrode active material. Furthermore, the thickness "t" is, for example, the length in a direction perpendicular to the major surface of the electrode active material. These, for example, can be measured by observation of the electrode active material by an electron microscope. In the present invention, by using an electrode active material constituted by a flake-shaped active material, due to the action of the flake-shaped active material, it is possible to raise the fluidity of the composite particles for electrochemical device electrode and thereby possible to improve the shapeability.

Note that, as specific examples of the flake-shaped electrode active material used in the present invention, for example, flake-shaped graphite, flake-shaped lithium titanate, flake-shaped titanium-silicon alloy, flake-shaped silicon-carbite, etc. may be mentioned. Among these, from the viewpoint of being able to lower the internal resistance of the obtained electrochemical device electrode, flake-shaped graphite is preferable. Note that, when using an electrode active material constituted by flake-shaped graphite, the composite particles for electrochemical device electrode of the present invention may be suitably used as composite particles for negative electrode (for example, composite particles for negative electrode for lithium ion secondary cells or composite particles for negative electrode for lithium ion capacitors).

(Non-Water Soluble Particulate-Shaped Polymer)

The non-water soluble particle-shaped polymer used in the present invention is not particularly limited so long as a polymer which is non-water soluble and has a particle shape. In particular, as the non-water soluble particle-shaped polymer, one which can be present in the composite particles for electrochemical device electrode of the present invention in a state holding the particle state, that is, in a state holding the particle state on the electrode active material, is preferable. By being present in the composite particles for electrochemical device electrode in a state holding the particle shape, it becomes possible to bond the particles of the electrode active material well without impairing the electron conduction. Note that, in the present invention, "state holding the particle shape" does not have to be a state holding the particle shape completely. It is sufficient that it be a state holding the particle shape to a certain extent. For example, as a result that it makes the particles of the electrode active material bonded together, it may be a shape which is pressed in a certain extent by force being given by these electrode active material.

As such a non-water soluble particle-shaped polymer, for example, a polymer which is obtained by emulsion polymerization using water as a dispersant etc. may be mentioned. In this case, the non-water soluble particle-shaped polymer is used in a state dispersed in the dispersant constituted by water. As specific examples of this polymer, a fluorine-based polymer, diene-based polymer, acrylate-based polymer, silicon-based polymer, etc. may be mentioned. Among these, a diene-based polymer and acrylate-based polymer are preferably used.

A diene-based polymer is a polymer which contains structural units obtained by polymerization of a conjugated diene monomer (below, sometimes referred to as "conjugated diene monomer units"). Specifically, a homopolymer of a conjugated diene monomer, a copolymer obtained by polymerization of a monomer mixture which contains a conjugated diene monomer, etc. may be mentioned.

Among the diene-based polymers, ones containing conjugated diene monomer units, ethylenically unsaturated carboxylic acid monomer units, and other monomer units which are copolymerizable with these may be mentioned. Note that, the ethylenically unsaturated carboxylic acid monomer units mean structural units obtained by polymerization of an ethylenically unsaturated carboxylic acid monomer. The other monomer units which are copolymerizable with these mean structural units obtained by polymerization of other monomers which are copolymerizable with these.

As the conjugated diene monomer which forms the conjugated diene monomer units, for example, 1,3-butadiene, 2-methyl-1,3-butadiene, 2,3-dimethyl-1,3-butadiene, 1,3-pentadiene, 2-chloro-1,3-butadiene, substituted linear conjugated pentadienes, substituted and side chain conjugated hexadienes, etc. may be mentioned. These conjugated diene monomers may be used alone or in combinations of two or more types. Among these, 1,3-butadiene is preferable.

The ratio of content of the conjugated diene monomer units in the diene-based polymer is preferably 20 to 60 wt %, more preferably 30 to 55 wt %. By making the ratio of content of the conjugated diene monomer units in the above range, it is possible to maintain the electrolyte resistance well while improving the adhesion with the current collector.

As the ethylenically unsaturated carboxylic acid monomer which forms the ethylenically unsaturated carboxylic acid monomer units, acrylic acid, methacrylic acid, crotonic acid, maleic acid, fumaric acid, itaconic acid, and other monocarboxylic acids, dicarboxylic acid or dicarboxylic acid anhydride etc. may be mentioned. These ethylenically unsaturated carboxylic acid monomers may be used alone or in combinations of two or more types. Among these, methacrylic acid and itaconic acid are preferable, while methacrylic acid is more preferable.

The ratio of content of the ethylenically unsaturated carboxylic acid monomer units in the diene-based polymer is preferably 0.5 to 10 wt %, more preferably 1 to 8 wt %, furthermore preferably 2 to 7 wt %. By making the ratio of content of the ethylenically unsaturated carboxylic acid monomer units in the above range, it is possible to suppress a rise in viscosity when preparing the slurry and possible to make the obtained slurry stable.

As the other monomers which form other copolymerizable monomer units, aromatic vinyl-based monomers, vinyl cyanide-based monomers, unsaturated carboxylic acid alkyl ester monomers, unsaturated monomers which contain hydroxyalkyl groups, unsaturated carboxylic acid amide monomers, etc. may be mentioned. These other monomers may be used alone or in combinations of two or more types. Among these, aromatic vinyl-based monomers and vinyl cyanide-based monomers are preferable, while aromatic vinyl-based monomers are more preferable.

As the aromatic vinyl-based monomers, for example, styrene, α-methylstyrene, β-methylstyrene, vinyl toluene, etc. may be mentioned.

As the vinyl cyanide-based monomers, for example, acrylonitrile, methacrylonitrile, α-chloroacrylonitrile, α-ethylacrylonitrile, etc. may be mentioned.

As the unsaturated carboxylic acid alkyl ester monomers, for example, methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, 2-ethylhexyl acrylate, etc. may be mentioned.

As the unsaturated monomers which contain hydroxyalkyl groups, for example, β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di-(ethyleneglycol) maleate, di-(ethyleneglycol) itaconate, 2-hydroxyethyl maleate, bis(2-hydroxyethyl)maleate, 2-hydroxyethylmethyl fumarate, etc. may be mentioned.

As the unsaturated carboxylic acid amide monomers, for example, acrylamide, methacrylamide, N-methylolacrylamide, N-methylolmethacrylamide, N,N-dimethylacrylamide, etc. may be mentioned.

The ratio of content of the other copolymerizable monomer units in the diene-based polymer is preferably 30 to 79.5 wt %, more preferably 35 to 69 wt %. By making the ratio of content of the other copolymerizable monomer units in the above range, it is possible to hold a good electrolyte resistance while improving the adhesion with the current collector.

The acrylate polymer is a polymer which includes structural units obtained by polymerization of a (meth)acrylic acid ester monomer (below, sometimes described as "(meth) acrylic acid ester monomer units"), Specifically, it is a homopolymer obtained by polymerization of a (meth)acrylic acid ester monomer (meaning an acrylic acid ester and/or methacrylic acid ester, same below) or a copolymer obtained by polymerization of a monomer mixture of the same.

As specific examples of the (meth)acrylic acid ester monomer, methyl (meth)acrylate, ethyl (meth)acrylate, propyl(meth)acrylate, isopropyl(meth)acrylate, n-butyl (meth)acrylate, isobutyl(meth)acrylate, cyclohexyl(meth)acrylate, 2-ethylhexyl(meth)acrylate, isopentyl(meth)acrylate, isooctyl(meth)acrylate, isobornyl(meth)acrylate, isodecyl(meth)acrylate, lauryl(meth)acrylate, stearyl(meth)acrylate, and tridecyl(meth)acrylate, or other (meth)acrylic acid alkyl esters; butoxyethyl(meth)acrylate, ethoxydiethyleneglycol (meth)acrylate, methoxydipropyleneglycol(meth)acrylate, methoxypolyethyleneglycol(meth)acrylate, phenoxyethyl (meth)acrylate, tetrahydrofurfuryl(meth)acrylate, or other ether-group containing (meth)acrylic acid esters; 2-hydroxyethyl(meth)acrylate, 2-hydroxypropyl(meth)acrylate, 2-hydroxy-3-phenoxypropyl(meth)acrylate, 2-(meth)acryloyloxyethyl-2-hydroxyethylphthalic acid, or other hydroxyl-group containing (meth)acrylic acid esters; 2-(meth)acryloyloxyethylphthalic acid, 2-(meth)acryloyloxyethylphthalic acid, or other carboxylic acid-containing (meth)acrylic acid esters; perfluorooctylethyl (meth)acrylate or other fluorine-group containing (meth) acrylic acid esters; ethyl (meth)acrylate phosphate or other phosphoric acid-group containing (meth)acrylic acid esters; glycidyl(meth)acrylate or other epoxy-group containing (meth)acrylic acid esters; dimethylaminoethyl(meth)acrylate or other amino-group containing (meth)acrylic acid esters; etc. may be mentioned.

These (meth)acrylic acid ester monomers may be used alone or in combinations of two or more types. Among these as well, from the viewpoint that it is possible to make the non-water soluble particle-shaped polymers ones with a low swellability with respect to the electrolytic solution, due to this it is possible to improve the cycle characteristics when made into an electrode, a (meth)acrylic acid alkyl ester is preferable, while a (meth)acrylic acid alkyl ester with alkyl groups of 6 to 12 carbon atoms is more preferable.

The ratio of content of the (meth)acrylic acid ester monomer units in the acrylate-based polymer is preferably 50 to 95 wt %, more preferably 60 to 90 wt %. By making the ratio of content of the (meth)acrylic acid ester units in the above range, it is possible to improve the flexibility when made into an electrochemical device electrode and possible to raise the resistance to cracking.

Further, the acrylate-based polymer may be a copolymer of the above-mentioned (meth)acrylic acid ester monomer and a monomer which can copolymerize with this. As such a copolymerizable monomer, for example, an $\alpha,\beta$-unsaturated nitrile monomer, a vinyl monomer which has an acid ingredient, etc. may be mentioned.

As the $\alpha,\beta$-unsaturated nitrile monomer, acrylonitrile, methacrylonitrile, $\alpha$-chloroacrylonitrile, $\alpha$-bromoacrylonitrile etc. may be mentioned. These may be used alone or in combinations of two or more types. Among these as well, acrylonitrile and methacrylonitrile are preferable and acrylonitrile is more preferable.

The ratio of content of $\alpha,\beta$-unsaturated nitrile monomer units (structural units obtained by polymerization of $\alpha,\beta$-unsaturated nitrile monomer) in the acrylate-based polymer is preferably 3 to 40 wt %, more preferably 5 to 30 wt %. By making the ratio of content of $\alpha,\beta$-unsaturated nitrile monomer units in the above range, the bonding force as the binder can be raised more.

As the vinyl monomer which has an acid ingredient, acrylic acid, methacrylic acid, itaconic acid, maleic acid, fumaric acid, etc. may be mentioned. These may be used alone or in combinations of two or more types. Among these, acrylic acid, methacrylic acid, and itaconic acid are preferable, while methacrylic acid and itaconic acid are more preferable.

The ratio of content of the vinyl monomer units which have an acid ingredient (structural units obtained by polymerization of a vinyl monomer which has an acid ingredient) in the acrylate-based polymer is preferably 1.0 to 7.0 wt %, more preferably 1.5 to 5.0 wt %. By making the ratio of content of the vinyl monomer units which have an acid ingredient in the above range, it is possible to improve the stability at the time when made into a slurry.

Furthermore, the acrylate-based polymer may be one obtained by copolymerization by the above-mentioned monomers and other copolymerizable monomers. As such other monomers, for example, carboxylic acid esters which have two or more carbon-carbon double bonds, aromatic vinyl-based monomers, amide-based monomers, olefins, diene-based monomers, vinyl ketones, heterocycle-containing vinyl compounds, etc. may be mentioned.

The non-water soluble particle-shaped polymer has a weight average molecular weight of preferably 10,000 to 1,000,000, more preferably 20,000 to 500,000. By making the non-water soluble particle-shaped polymer one with a weight average molecular weight in the above range, it is possible to make the strength sufficient when made into the electrochemical device electrode. Note that, the weight average molecular weight of the non-water soluble particle-shaped polymer can be found by gel permeation chromatography (GPC) using tetrahydrofuran as a development solvent as a value converted to polystyrene.

The non-water soluble particle-shaped polymer has an average particle size of preferably 50 to 500 nm, more preferably 70 to 400 nm in the case where the non-water soluble particle-shaped polymer is a diene-based polymer. Further, in the case where the non-water soluble particle-shaped polymer is an acrylate-based polymer, the non-water soluble particle-shaped polymer has an average particle size of preferably 50 to 200 nm, more preferably 60 to 185 nm, furthermore preferably 70 to 160 nm. By making the average particle size of the non-water soluble particle-shaped polymer in the above range, it is possible to obtain a good strength and flexibility when made into an electrochemical device electrode and, furthermore, it is possible to obtain a good stability when made into a slurry while improving the bonding force of the binder.

The ratio of content of the non-water soluble particle-shaped polymer in the composite particles for electrochemical device electrode of the present invention is preferably 0.1 to 10 parts by weight with respect to 100 parts by weight of the electrode active material, more preferably 0.5 to 5 parts by weight, furthermore preferably 0.8 to 3 parts by weight, when the electrode active material is an active material for positive electrode. Further, when the electrode active material is an active material for negative electrode, the ratio of content of the non-water soluble particle-shaped polymer is preferably 0.3 to 8 parts by weight with respect to 100 parts by weight of the electrode active material, more preferably 0.4 to 7 parts by weight, furthermore preferably 0.5 to 5 parts by weight. By making the ratio of content of the non-water soluble particle-shaped polymer in the above range, it is possible to improve the ion conduction when made into an electrochemical device electrode while improving more the bonding force of the particles of the electrode active material and the adhesion with respect to the current collector. Note that, when using a flake-shaped electrode active material as the electrode active material, the ratio of content of the non-water soluble particle-shaped polymer may be made one similar to the case where the electrode active material is an active material for negative electrode.

(Water-Soluble Polymer Having a Sulfonic Acid Group)

The water-soluble polymer having a sulfonic acid group used in the present invention is not particularly limited so long as it has a sulfonic acid group and exhibits water solubility. For example, a water-soluble polymer which has structural units obtained by polymerization of a sulfonic acid-group containing monomer (below, sometimes referred to as "monomer units which contain sulfonic acid groups"), a water-soluble polymer comprised of a water-soluble polymer to which a compound containing a sulfonic acid group is added, a water-soluble polymer obtained by polymerization using a polymerization initiator containing a sulfonic acid group, etc. may be mentioned. Among these, a water-soluble polymer which has monomer units which contain sulfonic acid groups is preferable. In the present invention, the water-soluble polymer having a sulfonic acid group acts as a dispersant. By including a water-soluble polymer having a sulfonic acid group, due to the action of the sulfonic acid group ($—SO_3H$), the effect of improving the dispersion of the electrode active material when made into a slurry and the effect of improving the adhesion with a current collector are exhibited.

In addition, the water-soluble polymer having a sulfonic acid group, for example, when using an electrode active material constituted by an active material which contains nickel, acts as a dispersant and pH adjuster when dispersed together with an active material which contains nickel and a non-water soluble particle-shaped polymer in water to make a slurry in the process of production of composite particles for electrochemical device electrode. Further, in the present invention, when made into a slurry, the problem in the past of the pH of the slurry ending up rising due to the effects of the nickel which the active material contains and the spray drying apparatus and other production apparatuses ending up corroding can be effectively prevented by the water-soluble polymer having a sulfonic acid group acting as a pH adjuster.

As the sulfonic acid-group containing monomer which forms monomer units which contain sulfonic acid groups, vinyl sulfonic acid, styrene sulfonic acid, allyl sulfonic acid, sulfoethyl methacrylate, sulfopropyl methacrylate, sulfobutyl methacrylate, and other sulfonic acid-group containing compounds not having a functional group other than a sulfonic acid group; 2-acrylamide-2-methyl propanesulfonic acid (AMPS) and other compounds which contain an amide group and sulfonic acid group; 3-allyloxy-2-hydroxy propanesulfonic acid (HAPS) and other compounds which contain a hydroxyl group and sulfonic acid group; etc. may be mentioned. Further, lithium salts, sodium salts, potassium salts, etc. of these may also be used. These may be used alone or in combinations of two or more types. Among these, 2-acrylamide-2-methyl propanesulfonic acid (AMPS) is preferable.

The ratio of content of the monomer units which contain sulfonic acid groups in the water-soluble polymer having a sulfonic acid group is preferably 2 to 15 wt %, more preferably 2 to 10 wt %, furthermore preferably 2 to 8 wt %. By making the ratio of content of the monomer units which contain sulfonic acid groups in the above range, it is possible to further enhance the effect of improvement of dispersion of the electrode active material at the time of making into the slurry and the effect of improvement of the adhesion with the current collector.

The water-soluble polymer having a sulfonic acid group used in the present invention preferably contains, in addition to the monomer units which contain sulfonic acid groups, structural units which are obtained by polymerization of a carboxyl-group containing monomer (below, sometimes referred to as "monomer units which contain carboxyl groups"). By including monomer units which contain carboxyl groups, it is possible to make the water-soluble polymer having a sulfonic acid group one which has not only a sulfonic acid group, but also a carboxyl group. Due to this, it is possible to further improve the dispersion of the electrode active material at the time of making into the slurry due to the electrostatic repulsion of the carboxyl group.

As the carboxyl-group containing monomer which forms the monomer units which contain carboxyl groups, for example, acrylic acid, methacrylic acid, crotonic acid, and other monocarboxylic acids; 2-ethylacrylic acid, isocrotonic acid, α-acetoxyacrylic acid, β-trans-aryloxyacrylic acid, α-chloro-β-E-methoxyacrylic acid, β-diaminoacrylic acid, and other derivatives of monocarboxylic acids; maleic acid, fumaric acid, itaconic acid, and other dicarboxylic acids; maleic anhydride, acrylic anhydride, methyl maleic anhydride, dimethyl maleic anhydride, and other acid anhydrides of dicarboxylic acids; methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, fluoroalkyl maleate, or other derivatives of dicarboxylic acids; etc. may be mentioned. These may be used alone or in combinations of two or more types. Among these, acrylic acid, methacrylic acid and itaconic acid are preferable, and acrylic acid and methacrylic acid are more preferable.

The ratio of content of the monomer units which contain carboxyl groups in the water-soluble polymer having a sulfonic acid group is preferably 20 to 60 wt %, more preferably 20 to 50 wt %, furthermore preferably 20 to 40 wt %. By making the ratio of content of the monomer units which contain carboxyl groups in the above range, it is possible to further improve the adhesion with the current collector.

Further, the water-soluble polymer having a sulfonic acid group used in the present invention preferably further contains, in addition to the above-mentioned monomer units which contain sulfonic acid groups and monomer units which contain carboxyl groups, structural units which are obtained by polymerization of a (meth)acrylic acid ester monomer (below, sometimes referred to as "(meth)acrylic acid ester monomer units").

As the (meth)acrylic acid ester monomer which forms the (meth)acrylic acid ester monomer units, methyl (meth)acrylate, ethyl (meth)acrylate, butyl (meth)acrylate, hexyl(meth)acrylate, 2-ethylhexyl(meth)acrylate, or other (meth)acrylic acid alkyl esters; ethyleneglycol dimethacrylate, diethyleneglycol dimethacrylate, trimethylolpropane triacrylate, or other carboxylic acid esters which have at least two carbon-carbon double bonds; etc. may be mentioned. These may be used alone or in combinations of two or more types. Among these (meth)acrylic acid alkyl esters are preferable, methyl (meth)acrylate, ethyl (meth)acrylate, and butyl (meth)acrylate are more preferable. In the present invention, among the (meth)acrylic acid ester monomers, ones which contain fluorine are differentiated from (meth)acrylic acid ester monomers as fluorine-containing (meth)acrylic acid ester monomers.

The ratio of content of the (meth)acrylic acid ester monomer units in the water-soluble polymer having a sulfonic acid group is preferably 25 to 78 wt %, more preferably 45 to 75 wt %, furthermore preferably 60 to 70 wt %. By making the ratio of content of (meth)acrylic acid ester monomer units in the above range, it is possible to raise the effect of improvement of adhesion with the current collector more.

The water-soluble polymer having a sulfonic acid group has a weight average molecular weight of preferably 1,000 to 100,000, more preferably 1,500 to 80,000, furthermore preferably 2,000 to 75,000. By making the weight average molecular weight in the above range, it is possible to raise the effect of improvement of adhesion with the current collector more. Note that the water-soluble polymer having a sulfonic acid group has a weight average molecular weight can be found by gel permeation chromatography (GPC) as a value converted to polystyrene using as a development solvent a solution of a 10 vol % aqueous solution of dimethyl formamide in which 0.85 g/ml of sodium nitrate is dissolved.

Further, the water-soluble polymer having a sulfonic acid group has a glass transition temperature of preferably 0 to 70° C., more preferably 0 to 50° C., furthermore preferably 0 to 40° C. By making the glass transition temperature in the above range, it is possible to improve the flexibility in the case of making into an electrochemical device electrode.

The method of production of a water-soluble polymer having a sulfonic acid group is not particularly limited, but, for example, it can be produced by emulsion polymerization using water as a dispersant.

The ratio of content of a water-soluble polymer having a sulfonic acid group in the composite particles for electrochemical device electrode of the present invention is, when the electrode active material is an active material for positive electrode, preferably 0.1 to 1.5 parts by weight with respect to 100 parts by weight of the electrode active material, more preferably 0.2 to 1.3 parts by weight, furthermore preferably 0.3 to 1 parts by weight. Further, when the electrode active material is an active material for negative electrode, the ratio of content of the water-soluble polymer having a sulfonic acid group is preferably 0.01 to 2 parts by weight with respect to 100 parts by weight of the electrode active material, more preferably 0.03 to 1 part by weight, furthermore preferably 0.05 to 0.5 part by weight. By making the ratio of content of the water-soluble polymer having a sulfonic acid group in the above range, it is possible to suitably obtain the effect of improvement of the dispersion of the electrode active material when made into a slurry and the effect of improvement of the adhesion with the current collector. Furthermore, it is possible to obtain good ion conduction when made into an electrochemical device electrode while enhancing more the effect of improvement of the bonding force of the particles of the electrode active material and adhesion to a current collector. Note that, when using a flake-shaped electrode active material as the electrode active material, the ratio of content of the water-soluble polymer having a sulfonic acid group may be made one similar to the case where the electrode active material is an active material for negative electrode.

Further, in the present invention, the ratio of the above-mentioned non-water soluble particle-shaped polymer and the water-soluble polymer having a sulfonic acid group is, by weight ratio of the "non-water soluble particle-shaped polymer/water-soluble polymer having a sulfonic acid group", preferably 70/30 to 90/10, more preferably 70/30 to 85/15, furthermore preferably 70/30 to 80/20, when the electrode active material is an active material for positive electrode. Further, when the electrode active material is an active material for negative electrode, it is, by weight ratio of the "non-water soluble particle-shaped polymer/water-soluble polymer having a sulfonic acid group", preferably 80/20 to 99.9/0.1, more preferably 85/15 to 95/5, furthermore preferably 83/17 to 95/5. By making the ratio of these in the above range, it is possible to further improve the dispersion of the electrode active material when made into a slurry. Note that, when using an electrode active material constituted by a flake-shaped electrode active material, the ratio of the non-water soluble particle-shaped polymer and the water-soluble polymer having a sulfonic acid group may be made one similar to the case where the electrode active material is an active material for negative electrode.

(Conductive Material)

The composite particles for electrochemical device electrode of the present invention may contain a conductive material if necessary in addition to the above ingredients.

The conductive material is not particularly limited so long as a particle-shaped material which has conductivity, but, for example, furnace black, acetylene black, ketjen black, or other conductive carbon blacks; natural graphite, artificial graphite, or other graphites; or polyacrylonitrile-based carbon fiber, pitch-based carbon fiber, carbon fiber obtained by vapor phase method, or other carbon fibers; may be mentioned. The average particle size of the conductive material is not particularly limited, but is preferably smaller than the average particle size of the electrode active material and is usually 0.001 to 10 μm, more preferably 0.05 to 5 μm, furthermore preferably 0.01 to 1 μm in range. If the average particle size of the conductive material is in the above range, it is possible to express sufficient conductivity by a smaller amount of use.

The ratio of content of the conductive material in the composite particles for electrochemical device electrode of the present invention is preferably 0.1 to 50 parts by weight with respect to 100 parts by weight of the electrode active material, more preferably 0.5 to 15 parts by weight, furthermore preferably 1 to 10 parts by weight. By making the ratio of content of the conductive material in the above range, it becomes possible to maintain the capacity of the obtained electrochemical device high while sufficiently reducing the internal resistance.

(Composite Particles for Electrochemical Device Electrode)

The composite particles for electrochemical device electrode of the present invention contain the electrode active material, the non-water soluble particle-shaped polymer, and the water-soluble polymer having a sulfonic acid group, but these are not present as individually independent particles. Out of the three ingredients of the electrode active material, non-water soluble particle-shaped polymer, and water-soluble polymer having a sulfonic acid group, at least two ingredients, preferably three ingredients, form single particles. Further, in the composite particles, the water-soluble polymer having a sulfonic acid group may also be present in a particle shape.

Specifically, a plurality of individual particles of the three ingredients bond together to form secondary particles. A plurality of (preferably several to several dozen) particles of the electrode active material are preferably bonded by the non-water soluble particle-shaped polymer and/or water-soluble polymer having a sulfonic acid group to form clumps of particles.

Further, the composite particles are not particularly limited in shape and structure, but from the viewpoint of the fluidity, the shape is preferably one close to a sphere. The structure is preferably one where the non-water soluble particle-shaped polymer and water-soluble polymer having a sulfonic acid group are not concentrated at the surface of the composite particles, but are uniformly dispersed in the composite particles.

The method of production of the composite particles for electrochemical device electrode of the present invention is not particularly limited, but according to the spray drying granulation method which is explained below, the composite particles for electrochemical device electrode of the present invention can be obtained relatively easily, so this is preferable. Below, the spray drying granulation method will be explained.

First, a slurry for composite particles which contains the electrode active material, the non-water soluble particle-shaped polymer, and the water-soluble polymer having a sulfonic acid group is prepared. The slurry for composite particles can be prepared by dispersing or dissolving in a solvent the electrode active material, non-water soluble particle-shaped polymer, and water-soluble polymer having a sulfonic acid group and the conductive material which is added according to need. Note that, in this case, when the non-water soluble particle-shaped polymer is dispersed in the dispersant constituted by water, it is possible to add it in the state dispersed in water. Further, when the water-soluble polymer having a sulfonic acid group is in a state dissolved in water, it is possible to add it in the state dissolved in water.

As the solvent used to obtain the slurry for composite particles, usually water is used, but it is also possible to use a mixed solvent of water and an organic solvent. As the organic solvent which can be used in this case, for example, methyl alcohol, ethyl alcohol, propyl alcohol, or other alkyl alcohols; acetone, methylethylketone, or other alkylketones; tetrahydrofuran, dioxane, diglyme, or other ethers; diethyl formamide, dimethyl acetoamide, N-methyl-2-pyrrolidone, dimethyl imidazolidinone, or other amides; dimethyl sulfoxides, sulfolane, or other sulfur-based solvents; etc. may be mentioned. Among these, alcohols are preferable. By jointly using water and an organic solvent with a boiling point lower than water, it is possible to accelerate the drying speed at the time of spray drying. Further, depending on the amount or type of the organic solvent which is used together with water, it is possible to change the dispersion ability of the non-water soluble particle-shaped polymer and the solubility of the water-soluble polymer having a sulfonic acid group. Further, due to this, it is possible to adjust the viscosity and fluidity of the slurry for composite particles and possible to improve the production efficiency.

The amount of the solvent which is used for preparing the slurry for composite particles is one which gives a solid content concentration in the slurry for composite particles of preferably 1 to 50 wt %, more preferably 5 to 50 wt %, furthermore preferably 10 to 30 wt % in range. By making the solid content concentration in the above range, it is possible to uniformly disperse the non-water soluble particle-shaped polymer, so this is preferable.

Further, the viscosity of the slurry for composite particles is, at room temperature, preferably 10 to 3,000 mPa·s, more preferably 30 to 1,500 mPa·s, furthermore preferably 50 to 1,000 mPa·s in range. If the viscosity of the slurry for composite particles is in this range, it is possible to raise the productivity of the process of spray drying granulation.

Further, in the present invention, when preparing the slurry for composite particles, in accordance of need, it is possible to add a dispersant other than the above-mentioned water-soluble polymer having a sulfonic acid group or a surfactant.

The dispersant other than the water-soluble polymer having a sulfonic acid group is not particularly limited so long as a resin which can dissolve in a solvent, but, for example, carboxymethylcellulose, methylcellulose, ethylcellulose, hydroxypropylcellulose, hydroxypropylmethylcellulose, or other cellulose-based polymers and ammonium salts or alkali metal salts of these; an ammonium salt or alkali metal salt of polyacrylic acid or polymethacrylic acid; polyvinyl alcohol, modified polyvinyl alcohol, polyethylene oxide; polyvinyl pyrrolidone, polycarboxylic acid, starch oxide, starch phosphate, casein, various modified starches, chitin, chitosan derivatives, etc. may be mentioned. These dispersants may be used alone or in combinations of two or more types. Among these, as the dispersant, a cellulose-based polymer is preferable and carboxymethylcellulose or its ammonium salt or alkali metal salt is particularly preferable. The amount of use of the dispersant other than the water-soluble polymer having a sulfonic acid group preferably, in relation to the content of the water-soluble polymer having a sulfonic acid group, has a weight ratio of the "dispersant other than the water-soluble polymer having a sulfonic acid group/water-soluble polymer having a sulfonic acid group" of 3/7 or less in range.

Further, as the surfactant, an anionic, cationic, nonionic, nonionic anion, or other amphoteric surfactants may be mentioned, but an anionic or nonionic surfactant which easily breaks down by heat is preferable. The amount of the surfactant is preferably 50 parts by weight or less with respect to 100 parts by weight of the electrode active material, more preferably 0.1 to 10 parts by weight, furthermore preferably 0.5 to 5 parts by weight.

The method or order of dispersing or dissolving the electrode active material, non-water soluble particle-shaped polymer, and water-soluble polymer having a sulfonic acid group and the conductive material which is added according to need is not particularly limited. Further, as the mixing device, for example, a ball mill, sand mill, beads mill, pigment disperser, stone mill, ultrasonic disperser, homogenizer, homomixer, planetary mixer, etc. can be used. The mixing is usually performed at room temperature to 80° C. in range for 10 minutes to several hours.

Next, the obtained slurry for composite particles was granulated by spray drying. Spray drying is a method of spraying a slurry in hot air to dry it. As the device which is used for spraying the slurry, an atomizer may be mentioned. As an atomizer, two types of devices of a rotary disk system and a pressurizing system may be mentioned. The rotary system type is a system which introduces the slurry at the approximate center of a disk which is rotating at a high speed, uses the centrifugal force of the disk to fling the slurry to the outside of the disk, and atomizes the slurry at that time. In the rotary disk type, the rotational speed of the disk depends on the size of the disk, but is usually 5,000 to 30,000 rpm, preferably 15,000 to 30,000 rpm. The lower the rotational speed of the disk, the larger the sprayed drops and the greater the average particle size of the obtained composite particles for electrochemical device electrode. As the rotary disk type atomizer, the pin type and the vane type may be mentioned, but a pin type atomizer is preferable. The pin type atomizer is one type of centrifugal atomizer which uses a spray disk. The spray disk is configured by a top and bottom mounting disk between which a plurality of spray rollers are detachably attached on a substantially concentric circle along their circumferential edges. The slurry for composite particles is introduced from the center of the spray disk, deposits on the spray rollers by centrifugal force, passes over the roller surfaces to the outside, and finally detaches from the roller surfaces and is sprayed outward. On the other hand, the pressurized system is a system which pressurizes the slurry for composite particles and sprays it from a nozzle to dry it.

The temperature of the slurry for composite particles which is sprayed is usually room temperature, but it may also be made a temperature higher than room temperature by heating. Further, the hot air temperature at the time of spray drying is usually 80 to 250° C., preferably 100 to 200° C. In the spray drying method, the method of blowing in the hot air is not particularly limited. For example, the system where the hot air and spray directions are concurrent in the horizontal direction, the system where the slurry is sprayed at the top part of the drying tower and descends together with the hot air, the system where the sprayed drops and hot air contact countercurrently, the system where the sprayed drops flow concurrently with the initial hot air then descend by gravity and contact it countercurrently, etc. may be mentioned.

Note that, as the atomization method, other than the method of spraying all at once the slurry for composite particles which contains the electrode active material, non-water soluble particle-shaped polymer, and water-soluble polymer having a sulfonic acid group, it is also possible to use the method of spraying a slurry which contains the non-water soluble particle-shaped polymer, water-soluble polymer having a sulfonic acid group, and other additives in accordance with need on a flowing electrode active material. The optimum method for the ingredients of the composite particles etc. should be suitably selected from the viewpoint of the ease of control of the particle size, the ability to reduce the particle size distribution, etc.

The composite particles for electrochemical device electrode of the present invention which are obtained in this way have an average particle size of preferably 0.1 to 1,000 μm, more preferably 1 to 80 μm, furthermore preferably 10 to 40 μm. By making the average particle size in the above range, it is possible to increase more the fluidity of the composite particles for electrochemical device electrode. Note that, the average particle size of the composite particles for electrochemical device electrode is the volume average size which is measured by a laser diffraction particle size measurement device (for example, SALD-3100; made by Shimadzu Corporation) and calculated.

<Material for Electrochemical Device Electrode>

The material for electrochemical device electrode of the present invention includes the above-mentioned composite particles for electrochemical device electrode of the present invention. The composite particles for electrochemical device electrode of the present invention are used alone or with the inclusion of another binder or other additive according with need as the material for electrochemical device electrode. The content of the composite particles for electrochemical device electrode which is included in the material for electrochemical device electrode is preferably 50 wt % or more, more preferably 70 wt % or more, furthermore preferably 90 wt % or more.

As another binder which is used according with need, for example, it is possible to use the non-water soluble particle-shaped polymer which is contained in the above-mentioned composite particles for electrochemical device electrode of the present invention. The composite particles for electrochemical device electrode of the present invention already contain the binder constituted by the non-water soluble particle-shaped polymer, so when preparing the material for electrochemical device electrode, there is no need to separately add another binder, but another binder may also be added to raise the bonding force between composite particles for electrochemical device electrode. Further, the amount of addition of the other binder when adding another binder is, by total with the non-water soluble particle-shaped polymer in the composite particles for electrochemical device electrode, preferably 0.01 to 10 parts by weight with respect to 100 parts by weight of the electrode active material, more preferably 0.1 to 5 parts by weight. Further, as the other additives, water or alcohol and other shaping aids etc. may be mentioned. These may be suitably selected and added in amounts not detracting from the effect of the present invention.

<Electrochemical Device Electrode>

The electrochemical device electrode of the present invention is comprised of an electrode active material layer comprised of the above-mentioned material for electrochemical device electrode of the present invention laminated on a current collector. As the material for current collector, for example, a metal, carbon, conductive polymer, etc. can be used. Preferably, a metal is used. As the metal, usually, aluminum, platinum, nickel, tantalum, titanium, stainless steel, and alloys etc. may be used. Among these, from the viewpoint of the conductivity and voltage resistance, aluminum or an aluminum alloy is preferably used. Further, when a high voltage resistance is required, it is possible to suitably use the high purity aluminum which is disclosed in Japanese Patent Publication No. 2001-176757A etc. The current collector is a film or sheet shape. The thickness is suitably selected in accordance with the objective of use, but is usually 1 to 200 μm, preferably 5 to 100 μm, more preferably 10 to 50 μm.

When laminating the electrode active material layer on the current collector, the material for electrochemical device electrode may be made a sheet shape and then laminated on the current collector, but the method of directly press forming the material for electrochemical device electrode on the current collector is preferable. As the press forming, for example, the method of using a roll type press forming apparatus which is provided with a pair of rolls, feeding the current collector by the rolls while feeding the material for electrochemical device electrode by a screw feeder or other feed device to a roll type press forming apparatus so as to form an electrode active material layer on the current collector, the method of sprinkling the material for electrochemical device electrode over the current collector, smoothing the material for electrochemical device electrode by a blade etc. to adjust the thickness, then pressing it by a press device, the method of filling the material for electrochemical device electrode in a mold and pressing the mold to shape it, etc. may be mentioned. Among these, the roll forming method is preferable. In particular, the composite particles for electrochemical device electrode of the present invention have a high fluidity, so due to the high fluidity, it is possible to shape the material by roll press forming. Due to this, the productivity can be improved.

The temperature at the time of roll press forming, when using a non-water soluble particle-shaped polymer constituted by a diene-based polymer, is preferably 25 to 200° C., more preferably 50 to 150° C., furthermore preferably 80 to 120° C. Further, when using a non-water soluble particle-shaped polymer constituted by an acrylate-based polymer, the temperature at the time of roll press forming is preferably 0 to 200° C., more preferably a temperature 20° C. or more higher than the glass transition temperature of the non-water soluble particle-shaped polymer. By making the temperature at the time of roll press forming in the above range, it is possible to obtain sufficient adhesion between the active material layer and current collector.

The press linear pressure between the rolls at the time of roll forming is preferably 10 to 1,000 kN/m, more preferably 200 to 900 kN/m, furthermore preferably 300 to 600 kN/m, when using a non-water soluble particle-shaped polymer constituted by a diene-based polymer. Further, when using a non-water soluble particle-shaped polymer constituted by an acrylate-based polymer, the press linear pressure between rolls at the time of roll forming is preferably 0.2 to 30 kN/cm (20 to 3000 kN/m), more preferably 1.5 to 15 kN/cm (150 to 1500 kN/m). By making the linear pressure in the above range, it is possible to improve the uniformity of thickness of the electrode active material layer. Furthermore, the shaping speed at the time of roll forming is preferably 0.1 to 20 m/min, more preferably 1 to 10 m/min, furthermore preferably 4 to 10 m/min.

Further, to eliminate the fluctuations in thickness in the electrochemical device electrode which is formed and raise the density of the electrode active material layer to increase the capacity, it is also possible to post-press the electrode if necessary. The method of post-pressing is generally pressing by a roll. In the roll press process, two cylindrical rolls are arranged in parallel at the top and bottom across a narrow distance and made to rotate in opposite directions and the electrode is taken in between them to be pressed. At this time, it is possible to heat or cool or otherwise adjust the temperature of this in accordance with need.

The electrochemical device electrode of the present invention obtained in this way has an electrode active material layer obtained using the above-mentioned composite particles for electrochemical device electrode of the present invention, so the adhesion between the electrode active material layer and the current collector is high. Further, the internal resistance is low and the high temperature storage characteristics is excellent. For this reason, the electrochemical device electrode of the present invention can be suitably used as an electrode for a lithium ion secondary cell and other various electrochemical devices.

In addition, according to the present invention, the composite particles for electrochemical device electrode contains a water-soluble polymer having a sulfonic acid group, so, for example, even if using an electrode active material constituted by a positive electrode active material which contains nickel, it is possible to effectively prevent the occurrence of corrosion of the spray drying device due to the effects of the positive electrode active material which contains nickel and deterioration of characteristics due to contamination by foreign matter due to the same and as a result possible to achieve the above characteristics.

EXAMPLES

Below, examples and comparative examples will be given to specifically explain the present invention. In the examples, the parts and % are based on weight unless indicated otherwise.

Production Examples of Non-Water Soluble
Particle-Shaped Polymer and Water-Soluble
Polymer Having Sulfonic Acid Group In accordance with the following method, non-water soluble particle-shaped polymers (A1) to (A5) and water-soluble polymers having a sulfonic acid group (B1) to (B10) were produced.

Production Example 1: Production of Non-Water
Soluble Particle-Shaped Polymer (A1)

To a 5 MPa pressure resistant container equipped with a stirrer, styrene 50 parts, 1,3-butadiene 47 parts, methacrylic acid 3 parts, sodium dodecyl benzenesulfonate 4 parts, ion exchanged water 150 parts, a chain transfer agent constituted by t-dodecyl mercaptan 0.4 part, and a polymerization initiator constituted by potassium persulfate 0.5 part were charged. The mixture was sufficiently stirred, then was warmed to 50° C. to start the polymerization. Further, when the polymerization conversion rate reached 96%, the solution was cooled to stop the reaction to obtain an aqueous dispersion of the non-water soluble particle-shaped polymer (A1). The obtained non-water soluble particle-shaped polymer (A1) had a composition of styrene units 50%, 1,3-butadiene units 47%, and methacrylic acid units 3%.

Production Example 2: Production of Non-Water
Soluble Particle-Shaped Polymer (A2)

Except for changing the amount of the styrene from 50 parts to 57 parts and the amount of the 1,3-butadiene from 47 parts to 40 parts, the same procedure was followed as in Production Example 1 to obtain an aqueous dispersion of the non-water soluble particle-shaped polymer (A2). The obtained non-water soluble particle-shaped polymer (A2) had a composition of styrene units 57%, 1,3-butadiene units 47%, and methacrylic acid units 3%.

Production Example 3: Production of Non-Water
Soluble Particle-Shaped Polymer (A3)

Except for changing the amount of the styrene from 50 parts to 40 parts and the amount of the 1,3-butadiene from 47 parts to 57 parts, the same procedure was followed as in Production Example 1 to obtain an aqueous dispersion of the non-water soluble particle-shaped polymer (A3). The obtained non-water soluble particle-shaped polymer (A3) had a composition of styrene units 40%, 1,3-butadiene units 57%, and methacrylic acid units 3%.

Production Example 4: Production of Non-Water
Soluble Particle-Shaped Polymer (A4)

Except for changing the amount of 1,3-butadiene from 50 parts to 47 parts and the amount of methacrylic acid from 3 parts to 6 parts, the same procedure was followed as in Production Example 1 to obtain an aqueous dispersion of a non-water soluble particle-shaped polymer (A4). The obtained non-water soluble particle-shaped polymer (A4) had a composition of styrene units 47%, 1,3-butadiene units 47%, and methacrylic acid units 6%.

Production Example 5: Production of Non-Water
Soluble Particle-Shaped Polymer (A5)

A polymerization vessel A was charged with ion exchanged water 130 parts. To this, a polymerization initiator constituted by ammonium persulfate 0.8 part and ion exchanged water 10 parts were added, then the mixture was warmed to 80° C. Further, a polymerization vessel B separate from this was charged and stirred with 2-ethylhexyl acrylate 78 parts, acrylonitrile 20 parts, methacrylic acid 2 parts, and ion exchanged water 377 parts to prepare an emulsion. Further, the emulsion which was prepared in the polymerization vessel B was successively added over about 240 minutes to the polymerization vessel A, then was stirred for about 30 minutes. When the amount of consumption of the monomer became 95%, this was cooled to end the reaction and thereby obtain an aqueous dispersion of the non-water soluble particle-shaped polymer (A5). The obtained non-water soluble particle-shaped polymer (A5) had a glass transition temperature of −30° C., a dispersed particle size of 100 nm, and a composition of 2-ethylhexyl acrylate units 77.75%, acrylonitrile units 20.25%, and methacrylic acid units 2%. Further, to the aqueous dispersion of the obtained non-water soluble particle-shaped polymer (A5), a 4 wt % sodium hydroxide aqueous solution was added to adjust the pH to 10.5.

Production Example 6: Production of Water-Soluble Polymer Having Sulfonic Acid Group (B1)

To a 5 MPa pressure resistant container equipped with a stirrer, a monomer mixer comprised of ion exchanged water 50 parts, sodium hydrogen carbonate 0.4 part, concentration 30% sodium dodecyldiphenylether sulfonate 0.115 part, methacrylic acid 30 parts, ethyl acrylate 35 parts, butyl acrylate 32.5 parts, and 2-acrylamide-2-methyl propane sulfonic acid (AMPS) 2.5 parts was charged and sufficiently stirred to obtain an emulsion aqueous solution. Further, separate from the above, a volume 1 liter SUS separable flask equipped with a stirrer, reflux cooling tube, and thermometer was charged in advance with demineralized water and sufficiently stirred, then was warmed to 70° C. and charged with a potassium persulfate aqueous solution 0.2 part. To this, the above obtained emulsion aqueous solution was dropped continuously over 4 hours to the potassium persulfate aqueous solution. Further, when the polymerization conversion rate reached 90%, the reaction temperature was changed to 80° C., the reaction was further performed for 2 hours, then the solution was cooled to stop the reaction and thereby obtain an aqueous dispersion which contains a water-soluble polymer having a sulfonic acid group (B1). Note that, the polymerization conversion rate was 99%, the glass transition temperature was 38° C., the weight average molecular weight was 25,000, and, further, the water-soluble polymer having a sulfonic acid group (B1) had a composition of methacrylic acid units 30%, ethyl acrylate units 35%, butyl acrylate units 32.5% and 2-acrylamide-2-methyl propanesulfonic acid units 2.5%.

Production Example 7: Production of Water-Soluble Polymer Having Sulfonic Acid Group (B2)

Except for changing the amount of the ethyl acrylate from 35 parts to 33 parts, the amount of butyl acrylate from 32.5 parts to 30 parts, and the amount of the 2-acrylamide-2-methyl propanesulfonic acid from 2.5 parts to 7 parts, the same procedure was followed as in Production Example 6 to obtain an aqueous dispersion which contains a water-soluble polymer having a sulfonic acid group (B2). Note that, the polymerization conversion rate was 99%, the glass transition temperature was 45° C., the weight average molecular weight was 50,000, and, further, the water-soluble polymer having a sulfonic acid group (B2) had a composition of methacrylic acid units 30%, ethyl acrylate units 33%, butyl acrylate units 30%, and 2-acrylamide-2-methyl propanesulfonic acid units 7%.

Production Example 8: Production of Water-Soluble Polymer Having Sulfonic Acid Group (B3)

Except for using, instead of the 2-acrylamide-2-methyl propanesulfonic acid 2.5 parts, styrenesulfonic acid 2.5 parts, the same procedure was followed as in Production Example 6 to obtain an aqueous dispersion which contains a water-soluble polymer having a sulfonic acid group (B3). Note that, the polymerization conversion rate was 99%, the glass transition temperature was 58° C., the weight average molecular weight was 70,000, and, further, the water-soluble polymer having a sulfonic acid group (B3) had a composition of methacrylic acid units 30%, ethyl acrylate units 35%, butyl acrylate units 32.5%, and styrenesulfonic acid units 2.5%.

Production Example 9: Production of Water-Soluble Polymer Having Sulfonic Acid Group (B4)

Except for using, instead of the 2-acrylamide-2-methyl propanesulfonic acid 2.5 parts, 4-sulfobutyl methacrylate 2.5 parts, the same procedure was followed as in Production Example 6 to obtain an aqueous dispersion which contains a water-soluble polymer having a sulfonic acid group (B4). Note that, polymerization conversion rate was 99%, the glass transition temperature was 55° C., the weight average molecular weight was 40,000, and, further, the water-soluble polymer having a sulfonic acid group (B4) had a composition of methacrylic acid units 30%, ethyl acrylate units 35%, butyl acrylate units 32.5%, and 4-sulfobutyl methacrylate units 2.5%.

Production Example 10: Production of Water-Soluble Polymer Having Sulfonic Acid Group (B5)

Except for using, instead of the methacrylic acid 30 parts, acrylic acid 30 parts, the same procedure was followed as in Production Example 6 to obtain an aqueous dispersion which contains a water-soluble polymer having a sulfonic acid group (B5). Note that, the polymerization conversion rate was 99%, the glass transition temperature was 38° C., the weight average molecular weight was 25,000, and, further, the water-soluble polymer having a sulfonic acid group (B5) had a composition of acrylic acid units 30%, ethyl acrylate units 35%, butyl acrylate units 32.5%, and 2-acrylamide-2-methyl propanesulfonic acid units 2.5%.

Production Example 11: Production of Water-Soluble Polymer Having Sulfonic Acid Group (B6)

Except for not using methacrylic acid and changing the amount of 2-acrylamide-2-methylpropane sulfonic acid from 2.5 parts to 32.5 parts, the same procedure was followed as in Production Example 6 to obtain an aqueous dispersion which contains a water-soluble polymer having a sulfonic acid group (B6). Note that, the polymerization conversion rate was 99%, the glass transition temperature was 38° C., the weight average molecular weight was 25,000, and, further, the water-soluble polymer having a sulfonic acid group (B6) had a composition of ethyl acrylate units 35 parts, butyl acrylate units 32.5 parts, and 2-acrylamide-2-methyl propanesulfonic acid units 32.5 parts.

Production Example 12: Production of Water-Soluble Polymer (B7)

Except for not using the 2-acrylamide-2-methyl propanesulfonic acid and changing the amount of methacrylic acid from 30 parts to 32.5 parts, the same procedure was followed as in Production Example 6 to obtain an aqueous dispersion which includes a water-soluble polymer (B7). Note that, the polymerization conversion rate was 99%, the glass transition temperature was 38° C., the weight average molecular weight was 25,000, and, further, the water-soluble polymer (B7) had a composition of methacrylic acid units 32.5%, ethyl acrylate units 35%, and butyl acrylate units 32.5%.

Production Example 13: Production of Water-Soluble Polymer Having Sulfonic Acid Group (B8)

Except for changing the amount of the methacrylic acid from 30 parts to 18 parts, the amount of ethyl acrylate from 35 parts to 41 parts, and the amount of butyl acrylate from 32.5 parts to 38.5 parts, the same procedure was followed as in Production Example 6 to obtain an aqueous dispersion which contains a water-soluble polymer having a sulfonic acid group (B8). Note that, the polymerization conversion rate was 99%, the glass transition temperature was 38° C., the weight average molecular weight was 20,000, and, further, the water-soluble polymer having a sulfonic acid group (B8) had a composition of methacrylic acid units 18%, ethyl acrylate units 41%, butyl acrylate units 38.5% and 2-acrylamide-2-methyl propanesulfonic acid units 2.5%.

Production Example 14: Production of Water-Soluble Polymer Having Sulfonic Acid Group (B9)

Except for changing the amount of the methacrylic acid from 30 parts to 60 parts, the amount of ethyl acrylate from 35 parts to 16 parts, the amount of butyl acrylate from 32.5 parts to 14 parts, and the amount of 2-acrylamide-2-methylpropane sulfonic acid from 2.5 parts to 10 parts, the same procedure was followed as in Production Example 6 to obtain an aqueous dispersion which contains a water-soluble polymer having a sulfonic acid group (B9). Note that, polymerization conversion rate was 99%, the weight average molecular weight was 30,000, and, further, the water-soluble polymer having a sulfonic acid group (B9) had a composition of methacrylic acid units 60%, ethyl acrylate units 16%, butyl acrylate units 14% and 2-acrylamide-2-methyl propanesulfonic acid units 10%.

Production Example 15: Production of Water-Soluble Polymer Having Sulfonic Acid Group (B10)

Except for changing the amount of the methacrylic acid from 30 parts to 64 parts, the amount of ethyl acrylate from 35 parts to 18 parts, the amount of butyl acrylate from 32.5 parts to 17 parts, and the amount of 2-acrylamide-2-methyl propanesulfonic acid from 2.5 parts to 1 part, the same procedure was followed as in Production Example 6 to obtain an aqueous dispersion which contains a water-soluble polymer having a sulfonic acid group (B10). Note that, the polymerization conversion rate was 99%, the weight average molecular weight was 50,000, and, further, the water-soluble polymer having a sulfonic acid group (B10) had a composition of methacrylic acid units 64%, ethyl acrylate units 18%, butyl acrylate units 1%, and 2-acrylamide-2-methyl propanesulfonic acid units 1%.

Method of Evaluation and Criteria of Evaluation of Examples 1-1 to 1-14 and Comparative Examples 1-1 to 1-4

Various characteristics in Examples 1-1 to 1-14 and Comparative Examples 1-1 to 1-4 were tested in accordance with the following method and evaluated by the following criteria.

<Fluidity of Composite Particles for Electrode>

Using a Powder Tester P-100 (made by Hosokawa Micron), sieves were set on the vibrating table in the order, from the top, of a mesh of 250 μm, 150 μm, and 76 μm. Then, the vibrating swing width was made 1.0 mm, the vibrating time was made 60 seconds, and composite particles for electrode 2 g was gently placed and made to vibrate. The vibration was stopped, then the weights remaining on the sieves were measured and the cohesion degree (%) of the composite particles for electrode was measured in accordance with the following criteria.

That is, based on $$\alpha(\%) = [\text{amount of powder remaining at top stage sieve (250 μm mesh sieve)}] \div 2(g) \times 100$$

$$\beta(\%) = [\text{amount of powder remaining at middle stage sieve (150 μm mesh sieve)}] \div 2(g) \times 100 \times 0.6$$

$$\gamma(\%) = [\text{amount of powder remaining at bottom stage sieve (76 μm mesh sieve)}] \div 2(g) \times 100 \times 0.2$$

α, β, and γ were calculated and the cohesion degree (%)=βα+β+γ was calculated. Further, the calculated cohesion degree was used as the basis to evaluate the fluidity of the composite particles for electrode by the following criteria.

A: cohesion degree of 0% to less than 10%
B: cohesion degree of 10% to less than 30%
C: cohesion degree of 30% to less than 50%
D: cohesion degree of 50% to less than 70%
E: cohesion degree of 70% or more <Peel Strength>

The negative electrode which was obtained in each of Examples 1-1 to 1-14 and Comparative Examples 1-1 to 1-4 was fastened with the negative electrode active material layer surface up, cellophane tape was adhered to the surface of the negative electrode active material layer, then the cellophane tape was peeled off from one end of the test piece by a speed of 50 mm/min in a 180° direction and the stress at that time was measured. Further, this measurement was performed 10 times and the average value was found. This was used as the peel strength and evaluated by the following criteria. Note that, the higher the peel strength, the higher the adhesion strength in the negative electrode active material layer and the adhesion strength between the negative electrode active material layer and the current collector can be judged.

A: peel strength of 10 N/m or more
B: peel strength of less than 10 N/m to 5 N/m
C: peel strength of less than 5 N/m to 1 N/m
D: peel strength of less than 1 N/m <Initial Capacity>

Each of the coin type half cells which were obtained in Examples 1-1 to 1-14 and Comparative Examples 1-1 to 1-4 was allowed to stand at room temperature for 24 hours after fabrication of the cell, then was charged down to 0.01V by the constant current method by a charging rate of 0.1 C (reaction of insertion of lithium into negative electrode active material), then was discharged up to 3.0V by a discharging rate of 0.1 C (reaction of extraction of lithium from negative electrode active material) to find the cell capacity at the time of 0.1 C charging and discharging. Further, from the obtained cell capacity, the capacity per unit weight of the negative electrode active material was calculated. This was made the initial capacity. The initial capacity was measured in accordance with the following criteria. The higher the initial capacity, the higher the cell capacity in the case of forming a lithium ion secondary cell, so this is preferable.
A: 380 mAh/g or more
B: less than 380 mAh/g
<Internal Resistance>

Each of the coin type lithium ion secondary cells which were obtained in Examples 1-1 to 1-14 and Comparative Examples 1-1 to 1-4 was allowed to stand at room temperature for 24 hours after fabrication of the cell, then was charged and discharged at room temperature by a charging voltage of 4.2V and a discharging voltage of 3.0V by a charging/discharging rate of 0.1 C. Further, after this, the cell was charged and discharged in a −30° C. environment by a discharge voltage of 3.0V by a charging/discharging rate of 0.1 C, then the amount of voltage drop (ΔV) 10 seconds after the start of discharge was measured to evaluate the internal resistance. The smaller the value of the amount of voltage drop 10 seconds after the start of discharge, the smaller the internal resistance and more possible high speed charging and discharge can be judged.
A: voltage drop of less than 0.2V
B: voltage drop of 0.2V to less than 0.3V
C: voltage drop of 0.3V to less than 0.5V
D: voltage drop of 0.5V to less than 0.7V
E: voltage drop of 0.7V or more
<High Temperature Storage Characteristics>

Each of the coin type lithium ion secondary cells which were obtained in Examples 1-1 to 1-14 and Comparative Examples 1-1 to 1-4 was allowed to stand for 24 hours after fabrication of the cells, then was charged/discharged by a charging voltage of 4.2V and discharging voltage of 3.0V by a charging/discharging rate of 0.1 C and was measured for the initial capacity $C_0$. Next, it was charged up to 4.2V and stored at 60° C. for 7 days, then was charged and discharged by a charging voltage 4.2V and a discharging voltage 3.0V by a charging/discharging rate of 0.1 C and was measured for capacity $C_1$ after high temperature storage. Further, the capacity retention rate was calculated in accordance with $\Delta C = C_1/C_0 \times 100(\%)$ and the following criteria were used to evaluate high temperature storage characteristics. The higher the value of the capacity retention rate, the better the high temperature storage characteristics can be judged.
A: ΔC of 85% or more
B: ΔC of 70% to less than 85%
C: ΔC of 60% to less than 70%
D: ΔC of 50% to less than 60%
E: ΔC of less than 50%

Example 1-1

Production of Composite Particles for Negative Electrode

A negative electrode active material constituted by SiOC (volume average particle size: 12 μm) 10 parts, artificial graphite (average particle size: 24.5 μm, distance between graphite layers (spacing between (002) planes by X-ray diffraction (d-value)): 0.354 nm) 90 parts, the non-water soluble particle-shaped polymer (A1) which was obtained in Production Example 1, 2.7 parts converted to solid content, and the water-soluble polymer having a sulfonic acid group (B1) which was obtained in Production Example 6, 0.3 part converted to solid content were mixed and, furthermore, ion exchanged water was added to give a solid content concentration of 20% and mixed and dispersed to obtain a slurry for composite particles. Further, the obtained slurry for composite particles was granulated by spray drying using a spray dryer (made by Ohkawara Kakohki) and using a rotary disk type atomizer (diameter 65 mm) under conditions of a speed of 25,000 rpm, a hot air temperature of 150° C., and a temperature at the particle recovery outlet of 90° C. to obtain the composite particles for negative electrode. The obtained composite particles had an average volume particle size of 40 μm.

Production of Negative Electrode

The above obtained composite particles for negative electrode were supplied on a roll of a roll press (rough surface hot roll, made by Hirano Gikenkogyo) (roll temperature 100° C., press linear pressure 4.0 kN/cm) together with a current collector constituted by electrolytic copper foil (thickness: 20 μm) and were formed into a sheet shape by a shaping speed of 20 m/min on a current collector constituted by electrolytic copper foil to obtain a negative electrode which has a thickness 80 μm negative electrode active material layer.

Production of Half Cell

Further, the negative electrode was punched into a disk shape of a diameter of 15 mm. On the negative electrode active material layer surface side of this negative electrode, a diameter 18 mm, thickness 25 μm disk-shaped separator comprised of a polypropylene porous film, a counter electrode constituted by metal lithium, and an expander metal were stacked in that order. The assembly was placed in a stainless steel coin-shaped outer container (diameter 20 mm, height 1.8 mm, stainless steel thickness 0.25 mm) set with a polypropylene packing. Next, into this container, an electrolytic solution (solvent: ethylene carbonate/diethyl carbonate=1/2 (volume ratio at 20° C.), electrolyte: 1M $LiPF_6$) was poured so as not to leave any air, a thickness 0.2 mm stainless steel cap was placed over the outer container and fastened through a polypropylene packing, and the battery case was sealed so as to produce a diameter 20 mm, thickness approximately 2 mm coin type half cell (secondary cell) for measurement of the initial capacity.

Production of Positive Electrode

To a positive electrode active material constituted by $LiCoO_2$ 95 parts, a binder for an electrode mixture layer constituted by PVDF (polyvinylidene fluoride) was added in a solid content of 3 parts. Furthermore, acetylene black 2 parts and N-methylpyrrolidone 20 parts were added and the result was mixed by a planetary mixer to obtain a positive electrode-use slurry. This positive electrode-use slurry was coated on a thickness 18 μm aluminum foil and dried at 120° C. for 30 minutes, then roll pressed to obtain a thickness 60 μm positive electrode.

Production of Lithium Ion Secondary Cell

The above obtained positive electrode was punched into a disk shape of a diameter of 13 mm and negative electrode into a disk shape of a diameter of 14 mm. On the positive electrode active material layer surface side of this positive electrode, a diameter 18 mm, thickness 25 μm disk-shaped separator comprised of a polypropylene porous film and the above obtained negative electrode were stacked in that order. The assembly was placed in a stainless steel coin-shaped outer container set with a polypropylene packing. Into this container, an electrolytic solution (solvent: ethylene carbonate/diethyl carbonate=1/2 (volume ratio at 20° C.), electrolyte: 1M $LiPF_6$) was poured so as not to leave any air, a thickness 0.2 mm stainless steel cap was placed over the outer container and fastened through a polypropylene packing, and the battery case was sealed so as to produce a diameter 20 mm, thickness approximately 3.2 mm coin type lithium secondary cell.

Further, the above obtained composite particles for negative electrode were used to evaluate the fluidity, the negative electrode was used to evaluate the peel strength, the half cell was used to evaluate the initial capacity, and the lithium ion secondary cell was used to evaluate the internal resistance and high temperature storage characteristics. The results are shown in Table 1.

Example 1-2

Except for not using a negative electrode active material constituted by SiOC and changing the amount of the artificial graphite from 90 parts to 100 parts, the same procedure was followed as in Example 1-1 to produce composite particles for negative electrode, a negative electrode, a half cell, and a lithium ion secondary cell and similarly evaluate them. The results are shown in Table 1.

Examples 1-3 to 1-5

Except for using, instead of the non-water soluble particle-shaped polymer (A1), the non-water soluble particle-shaped polymer (A2) which was obtained in Production Example 2 (Example 1-3), the non-water soluble particle-shaped polymer (A3) which was obtained in Production Example 3 (Example 1-4), and the non-water soluble particle-shaped polymer (A4) which was obtained in Production Example 4 (Example 1-5), the same procedure was followed as in Example 1-2 to produce composite particles for negative electrode, a negative electrode, a half cell, and a lithium ion secondary cell and similarly evaluate them. The results are shown in Table 1.

Examples 1-6 to 1-9

Except for using, instead of the water-soluble polymer having a sulfonic acid group (B1), the water-soluble polymer having a sulfonic acid group (B2) which was obtained in Production Example 7 (Example 1-6), the water-soluble polymer having a sulfonic acid group (B3) which was obtained in Production Example 8 (Example 1-7), the water-soluble polymer having a sulfonic acid group (B4) which was obtained in Production Example 9 (Example 1-8), and the water-soluble polymer having a sulfonic acid group (B5) which was obtained in Production Example 10 (Example 1-9), the same procedure was followed as in Example 1-2 to produce composite particles for negative electrode, a negative electrode, a half cell, and a lithium ion secondary cell and similarly evaluate them. The results are shown in Table 1.

Examples 1-10 to 1-13

Except for changing the amounts of the non-water soluble particle-shaped polymer (A1) and water-soluble polymer having a sulfonic acid group (B1) to the amounts which are shown in Table 2, the same procedure was followed as in Example 1-2 to produce composite particles for negative electrode, a negative electrode, a half cell, and a lithium ion secondary cell and similarly evaluate them. The results are shown in Table 2.

Example 1-14

Except for using, instead of the water-soluble polymer having a sulfonic acid group (B1), the water-soluble polymer having a sulfonic acid group (B6) which was obtained in Production Example 11, the same procedure was followed as in Example 1-2 to produce composite particles for negative electrode, a negative electrode, a half cell, and a lithium ion secondary cell and similarly evaluate them. The results are shown in Table 2.

Comparative Example 1-1

Except for using, instead of the water-soluble polymer having a sulfonic acid group (B1), the water-soluble polymer (B7) which was obtained in Production Example 12, the same procedure was followed as in Example 1-2 to produce composite particles for negative electrode, a negative electrode, a half cell, and a lithium ion secondary cell and similarly evaluate them. The results are shown in Table 2.

Comparative Example 1-2

Except for using, instead of the water-soluble polymer having a sulfonic acid group (B1), carboxymethylcellulose, the same procedure was followed as in Example 1-2 to produce composite particles for negative electrode, a negative electrode, a half cell, and a lithium ion secondary cell and similarly evaluate them. The results are shown in Table 2.

Comparative Example 1-3

Except for following the same procedure as in Example 1-2 to obtain a slurry for composite particles, coating the obtained slurry for composite particles on a current collector constituted by electrolytic copper foil, and drying it at 110° C. to form a negative electrode layer, the same procedure was followed as in Example 1-2 to produce a negative electrode, a half cell, and a lithium ion secondary cell and similarly evaluate them. The results are shown in Table 2.

Comparative Example 1-4

Except for not including the non-water soluble particle-shaped polymer (A1) and using, instead of the water-soluble polymer having a sulfonic acid group (B1), the water-soluble polymer having a sulfonic acid group (B8) which was obtained in Production Example 13, the same procedure was followed as in Example 1-2 to produce composite particles for negative electrode, whereupon the shapeability was extremely inferior and composite particles for negative electrode use could not be obtained.

TABLE 1

| | | Examples | | | | | | | | |
|---|---|---|---|---|---|---|---|---|---|---|
| | | 1-1 | 1-2 | 1-3 | 1-4 | 1-5 | 1-6 | 1-7 | 1-8 | 1-9 |
| Composition of composite particles for negative electrode | | | | | | | | | | |
| Artificial graphite | (part) | 90 | 100 | 100 | 100 | 100 | 100 | 100 | 100 | 100 |
| SiOC | (part) | 10 | — | — | — | — | — | — | — | — |
| Non-water soluble particle-shaped polymer | (part) | 2.7 | 2.7 | 2.7 | 2.7 | 2.7 | 2.7 | 2.7 | 2.7 | 2.7 |
| Water-soluble polymer | (part) | 0.3 | 0.3 | 0.3 | 0.3 | 0.3 | 0.3 | 0.3 | 0.3 | 0.3 |

TABLE 1-continued

|  |  | Examples | | | | | | | | |
|---|---|---|---|---|---|---|---|---|---|---|
|  |  | 1-1 | 1-2 | 1-3 | 1-4 | 1-5 | 1-6 | 1-7 | 1-8 | 1-9 |
| Non-water soluble particle-shaped polymer | | | | | | | | | | |
| Type of non-water soluble particle-shaped polymer | | A1 | A1 | A2 | A3 | A4 | A1 | A1 | A1 | A1 |
| Compo-sition | Styrene units (%) | 50 | 50 | 57 | 40 | 47 | 50 | 50 | 50 | 50 |
|  | 1,3-butadiene units (%) | 47 | 47 | 40 | 57 | 47 | 47 | 47 | 47 | 47 |
|  | Methacrylic acid units (%) | 3 | 3 | 3 | 3 | 6 | 3 | 3 | 3 | 3 |
| Water-soluble polymer | | | | | | | | | | |
| Type of water-soluble polymer | | B1 | B1 | B1 | B1 | B1 | B2 | B3 | B4 | B5 |
| Compo-sition | AMPS units (%) | 2.5 | 2.5 | 2.5 | 2.5 | 2.5 | 7 | — | — | 2.5 |
|  | Styrene sulfonic acid units (%) | — | — | — | — | — | — | 2.5 | — | — |
|  | 4-sulfobutyl methacrylate units (%) | — | — | — | — | — | — | — | 2.5 | — |
|  | Methacrylic acid units (%) | 30 | 30 | 30 | 30 | 30 | 30 | 30 | 30 | — |
|  | Acrylic acid units (%) | — | — | — | — | — | — | — | — | 30 |
|  | Ethyl acrylate (%) | 35 | 35 | 35 | 35 | 35 | 33 | 35 | 35 | 35 |
|  | Butyl acrylate (%) | 32.5 | 32.5 | 32.5 | 32.5 | 32.5 | 30 | 32.5 | 32.5 | 32.5 |
| Glass transition temperature (°C.) | | 38 | 38 | 38 | 38 | 38 | 45 | 58 | 55 | 38 |
| Weight average molecular weight | | 25000 | 25000 | 25000 | 25000 | 25000 | 50000 | 70000 | 40000 | 25000 |
| Method of formation of negative electrode active material layer | | Powder shaping | Powder shaping | Powder shaping | Powder shaping | Powder shaping | Powder shaping | Powder shaping | Powder shaping | Powder shaping |
| Evaluation | | | | | | | | | | |
| Fluidity of composite particles for negative electrode | | A | A | A | B | B | A | A | A | B |
| Peel strength of negative electrode | | A | A | B | A | A | B | B | B | A |
| Initial capacity | | A | B | B | B | B | B | B | B | B |
| Internal resistance | | A | A | B | A | A | B | B | B | A |
| High temperature storage characteristics | | A | A | A | B | A | A | A | A | A |

TABLE 2

|  |  | Examples | | | | | Comparative Examples | | | |
|---|---|---|---|---|---|---|---|---|---|---|
|  |  | 1-10 | 1-11 | 1-12 | 1-13 | 1-14 | 1-1 | 1-2 | 1-3 | 1-4 |
| Composition of composite particles for negative electrode | | | | | | | | | | |
| Artificial graphite (part) | | 100 | 100 | 100 | 100 | 100 | 100 | 100 | 100 | 100 |
| SiOC (part) | | — | — | — | — | — | — | — | — | — |
| Non-water soluble particle-shaped polymer (part) | | 2.55 | 2.79 | 4.15 | 0.9 | 2.7 | 2.7 | 2.7 | 2.7 | — |
| Water-soluble polymer (part) | | 0.45 | 0.21 | 0.45 | 0.1 | 0.3 | 0.3 | 0.3 | 0.3 | 0.3 |
| Non-water soluble particle-shaped polymer | | | | | | | | | | |
| Type of non-water soluble particle-shaped polymer | | A1 | A1 | A1 | A1 | A1 | A1 | A1 | A1 | — |
| Compo-sition | Styrene units (%) | 50 | 50 | 50 | 50 | 50 | 50 | 50 | 50 | — |
|  | 1,3-butadiene units (%) | 47 | 47 | 47 | 47 | 47 | 47 | 47 | 47 | — |
|  | Methacrylic acid units (%) | 3 | 3 | 3 | 3 | 3 | 3 | 3 | 3 | — |
| Water-soluble polymer | | | | | | | | | | |
| Type of water-soluble polymer | | B1 | B1 | B1 | B1 | B6 | B7 | Carboxy-methyl-cellulose | B1 | B8 |
| Compo-sition | AMPS units (%) | 2.5 | 2.5 | 2.5 | 2.5 | 32.5 | — | | 2.5 | 2.5 |
|  | Styrene sulfonic acid units (%) | — | — | — | — | — | — | | — | — |
|  | 4-sulfobutyl methacrylate units (%) | — | — | — | — | — | — | | — | — |
|  | Methacrylic acid units (%) | 30 | 30 | 30 | 30 | — | 32.5 | | 30 | 18 |
|  | Acrylic acid units (%) | — | — | — | — | — | — | | — | — |
|  | Ethyl acrylate (%) | 35 | 35 | 35 | 35 | 35 | 35 | | 35 | 41 |
|  | Butyl acrylate (%) | 32.5 | 32.5 | 32.5 | 32.5 | 32.5 | 32.5 | | 32.5 | 38.5 |
| Glass transition temperature (°C.) | | 38 | 38 | 38 | 38 | 38 | 38 | | 38 | 38 |
| Weight average molecular weight | | 25000 | 25000 | 25000 | 25000 | 25000 | 25000 | | 25000 | 20000 |
| Method of formation of negative electrode active material layer | | Powder shaping | Powder shaping | Powder shaping | Powder shaping | Powder shaping | Powder shaping | Powder shaping | coating shaping | Powder shaping |
| Evaluation | | | | | | | | | | |
| Fluidity of composite particles for negative electrode | | A | B | B | A | A | C | B | — | Shaping not possible |
| Peel strength of negative electrode | | B | A | A | B | B | C | D | C | |
| Initial capacity | | B | B | B | B | B | B | B | B | |
| Internal resistance | | B | A | A | B | B | C | D | D | |
| High temperature storage characteristics | | A | B | B | B | A | D | B | B | |

Evaluation of Examples 1-1 to 1-14 and
Comparative Examples 1-1 to 1-4

As shown in Tables 1 and 2, each of the samples of the composite particles for negative electrode which contain a negative electrode active material, non-water soluble particle-shaped polymer, and water-soluble polymer having a sulfonic acid group has a high fluidity, further, the negative electrode which was obtained by using the composite particles for negative electrode was high in peel strength, and, furthermore, when made into a cell, the cell was high in initial capacity, low in internal resistance, and excellent in high temperature storage characteristics (Examples 1-1 to 1-14).

On the other hand, when using a water-soluble polymer which does not contain a sulfonic acid group, the composite particles for negative electrode were low in fluidity and, further, the peel strength when made into a negative electrode and the internal resistance and high temperature storage characteristics when made into a cell were inferior (Comparative Example 1-1).

Further, when using carboxymethylcellulose instead of the water-soluble polymer having a sulfonic acid group, the peel strength when made into a negative electrode and the internal resistance when made into a cell were inferior (Comparative Example 1-2).

Furthermore, when, instead of obtaining composite particles for negative electrode and shaping the obtained composite particles for negative electrode in a powder state, coating the slurry which contains the negative electrode active material, non-water soluble particle-shaped polymer, and water-soluble polymer having a sulfonic acid group on a current collector as is to obtain a negative electrode, the obtained negative electrode was low in peel strength and, when made into a cell, the cell was further inferior in internal resistance (Comparative Example 1-3).

Further, when not using a non-water soluble particle-shaped polymer, a shaped article enabling the evaluations to be performed could not be obtained (Comparative Example 1-4).

Method of Evaluation and Evaluation Criteria of
Examples 2-1 to 2-15 and Comparative Examples
2-1 to 2-3

The various characteristics in Examples 2-1 to 2-15 and Comparative Examples 2-1 to 2-3 were tested in accordance with the following methods and evaluated by the following criteria.

<Fluidity of Composite Particles for Electrode>

The same procedure was followed as in the above-mentioned Examples 1-1 to 1-14 and Comparative Examples 1-1 to 1-4 to calculate the cohesion degree (%) and the following criteria were used to evaluate the fluidity of the composite particles for electrode. The higher the fluidity, the better the shapeability can be evaluated.
A: cohesion degree of 0% to less than 5%
B: cohesion degree of 5% to less than 10%
C: cohesion degree of 10% to less than 25%
D: cohesion degree of 25% to less than 50%
E: cohesion degree of 50% or more <Peel Strength>

The same procedure was followed as in the above-mentioned Examples 1-1 to 1-14 and Comparative Examples 1-1 to 1-4 to measure the peel strength and the following criteria were used to evaluate them. Note that, the higher the peel strength, the higher the adhesion strength in the negative electrode active material layer and the adhesion strength between the negative electrode active material layer and current collector can be judged.
A: peel strength of 10 N/m or more
B: peel strength of less than 10 N/m to 5 N/m
C: peel strength of less than 5 N/m to 1 N/m
D: peel strength of less than 1 N/m <Internal Resistance>

The same procedure was followed as in the above-mentioned Examples 1-1 to 1-14 and Comparative Examples 1-1 to 1-4 to measure the amount of voltage drop ($\Delta V$) after 10 seconds from the start of discharge so as to evaluate the internal resistance. The smaller the value of the amount of voltage drop after 10 seconds from the start of discharge, the smaller the internal resistance and the faster the charging and discharging can be judged.
A: voltage drop of less than 0.2V
B: voltage drop of 0.2V to less than 0.3V
C: voltage drop of 0.3V to less than 0.5V
D: voltage drop of 0.5V to less than 0.7V
E: voltage drop of 0.7V or more <High Temperature Storage Characteristics>

The same procedure was followed as in the above-mentioned Examples 1-1 to 1-14 and Comparative Examples 1-1 to 1-4 to calculate the capacity retention rate $\Delta C$ and the following criteria were used to evaluate high temperature storage characteristics. The higher the value of the capacity retention rate, the better the high temperature storage characteristics can be judged.
A: $\Delta C$ of 85% or more
B: $\Delta C$ of 70% to less than 85%
C: $\Delta C$ of 60% to less than 70%
D: $\Delta C$ of 50% to less than 60%
E: $\Delta C$ of less than 50%

Example 2-1

Production of Composite Particles for Negative Electrode

A negative electrode active material constituted by flake-shaped graphite (SLP-6, made by Timcal, length of long axis L1:3.5 μm, ratio (L2/t) of length of short axis L2 and thickness "t":15) 100 parts, the non-water soluble particle-shaped polymer (A1) which was obtained in Production Example 1, 2.7 parts converted to solid content, and the water-soluble polymer having a sulfonic acid group (B1) which was obtained in Production Example 6, 0.3 part converted to solid content were mixed and, furthermore, ion exchanged water was added to give a solid content concentration of 20%, then these were mixed and dispersed to obtain a slurry for composite particles. Further, the above obtained slurry for composite particles was granulated by spray drying using a spray dryer (made by Ohkawara Kakohki) and using a rotary disk type atomizer (diameter 65 mm) at a speed of 25,000 rpm, hot air temperature of 150° C., and particle recovery outlet temperature of 90° C. to obtain composite particles for negative electrode. The obtained composite particles had an average volume particle size of 40 μm.

Production of Negative Electrode, Production of Half Cell, and Production of Lithium Ion Secondary Cell Next, using the above obtained composite particles for negative electrode, the same procedure was followed as in Example 1-1 to produce a negative electrode, a half cell, and a lithium ion secondary cell.

Further, the above obtained composite particles for negative electrode were used to evaluate the fluidity, the negative electrode was used to evaluate the peel strength, and the lithium ion secondary cell was used to evaluate the internal resistance and high temperature storage characteristics. The results are shown in Table 3.

Example 2-2

Except for using as the negative electrode active material, instead of the flake-shaped graphite (SLP-6 made by Timcal), the flake-shaped graphite (SFG-6 made by Timcal, length of long axis L1:3.7 μm and ratio (L2/t) of length of the short axis L2 and thickness "t":30), the same procedure was followed as in Example 2-1 to produce composite particles for negative electrode, a negative electrode, a half cell, and a lithium ion secondary cell and similarly evaluate them. The results are shown in Table 3.

Example 2-3

Except for using as the negative electrode active material, instead of the flake-shaped graphite (SLP-6 made by Timcal), the flake-shaped graphite (SFG-10 made by Timcal, length of long axis L1:5.5 μm and ratio (L2/t) of length of short axis L2 and thickness "t":10), the same procedure was followed as in Example 2-1 to produce composite particles for negative electrode, a negative electrode, a half cell, and a lithium ion secondary cell and similarly evaluate them. The results are shown in Table 3.

Examples 2-4 to 2-6

Except for using, instead of the non-water soluble particle-shaped polymer (A1), the non-water soluble particle-shaped polymer (A2) which is obtained in Production Example 2 (Example 2-4), the non-water soluble particle-shaped polymer (A3) which is obtained in Production Example 3 (Example 2-5), and the non-water soluble particle-shaped polymer (A4) which is obtained in Production Example 4 (Example 2-6), the same procedure was followed as in Example 2-1 to produce composite particles for negative electrode, a negative electrode, a half cell, and a lithium ion secondary cell and similarly evaluate them. The results are shown in Table 3.

Examples 2-7 to 2-10

Except for using, instead of the water-soluble polymer having a sulfonic acid group (B1), the water-soluble polymer having a sulfonic acid group (B2) which was obtained in Production Example 7 (Example 2-7), the water-soluble polymer having a sulfonic acid group (B3) which was obtained in Production Example 8 (Example 2-8), the water-soluble polymer having a sulfonic acid group (B4) which was obtained in Production Example 9 (Example 2-9), and the water-soluble polymer having a sulfonic acid group (B5) which was obtained in Production Example 10 (Example 2-10), the same procedure was followed as in Example 2-1 to produce composite particles for negative electrode, a negative electrode, a half cell, and a lithium ion secondary cell and similarly evaluate them. The results are shown in Table 3.

Examples 2-11 to 2-14

Except for changing the amounts of the non-water soluble particle-shaped polymer (A1) and water-soluble polymer having a sulfonic acid group (B1) to the amounts which are shown in Table 4, the same procedure was followed as in Example 2-1 to produce composite particles for negative electrode, a negative electrode, a half cell, and a lithium ion secondary cell and similarly evaluate them. The results are shown in Table 4.

Example 2-15

Except for using, instead of the water-soluble polymer having a sulfonic acid group (B1), the water-soluble polymer having a sulfonic acid group (B6) which was obtained in Production Example 11, the same procedure was followed as in Example 2-1 to produce composite particles for negative electrode, a negative electrode, a half cell, and a lithium ion secondary cell and similarly evaluate them. The results are shown in Table 4.

Comparative Example 2-1

Except for using, instead of the water-soluble polymer having a sulfonic acid group (B1), carboxymethylcellulose, the same procedure was followed as in Example 2-1 to produce composite particles for negative electrode, a negative electrode, a half cell, and a lithium ion secondary cell and similarly evaluate them. The results are shown in Table 4.

Comparative Example 2-2

Except for following the same procedure was in Example 2-1 to obtain a slurry for composite particles and coating the obtained slurry for composite particles on a current collector constituted by electrolytic copper foil and drying it at 110° C. so as to form a negative electrode layer, the same procedure was followed as in Example 2-1 to produce a negative electrode, a half cell, and a lithium ion secondary cell and similarly evaluate them. The results are shown in Table 4.

Comparative Example 2-3

Except for not mixing in the non-water soluble particle-shaped polymer (A1), the same procedure was followed as in Example 2-1 to produce the composite particles for negative electrode whereupon the shapeability was extremely poor and the composite particles for negative electrode could not be obtained.

TABLE 3

|  |  | Examples | | | | | | | | | |
|---|---|---|---|---|---|---|---|---|---|---|---|
|  |  | 2-1 | 2-2 | 2-3 | 2-4 | 2-5 | 2-6 | 2-7 | 2-8 | 2-9 | 2-10 |
| Composition of composite particles for negative electrode | | | | | | | | | | | |
| Negative electrode active material | (part) | 100 | 100 | 100 | 100 | 100 | 100 | 100 | 100 | 100 | 100 |
| Non-water soluble particle-shaped polymer | (part) | 2.7 | 2.7 | 2.7 | 2.7 | 2.7 | 2.7 | 2.7 | 2.7 | 2.7 | 2.7 |
| Water-soluble polymer | (part) | 0.3 | 0.3 | 0.3 | 0.3 | 0.3 | 0.3 | 0.3 | 0.3 | 0.3 | 0.3 |

TABLE 3-continued

|  |  | Examples | | | | | | | | | |
|---|---|---|---|---|---|---|---|---|---|---|---|
|  |  | 2-1 | 2-2 | 2-3 | 2-4 | 2-5 | 2-6 | 2-7 | 2-8 | 2-9 | 2-10 |
| Negative electrode active material | | | | | | | | | | | |
| Shape | | Flake shape | Flake shape | Flake shape | Flake shape | Flake shape | Flake shape | Flake shape | Flake shape | Flake shape | Flake shape |
| Length of long axis L1 | (μm) | 3.5 | 3.7 | 5.5 | 3.5 | 3.5 | 3.5 | 3.5 | 3.5 | 3.5 | 3.5 |
| Ratio (L2/t) of length of short axis L2 and thickness "t" | | 15 | 30 | 10 | 15 | 15 | 15 | 15 | 15 | 15 | 15 |
| Non-water soluble particle-shaped polymer | | | | | | | | | | | |
| Type of non-water soluble particle-shaped polymer | | A1 | A1 | A1 | A2 | A3 | A4 | A1 | A1 | A1 | A1 |
| Composition | Styrene units (%) | 50 | 50 | 50 | 57 | 40 | 47 | 50 | 50 | 50 | 50 |
| | 1,3-butadiene units (%) | 47 | 47 | 47 | 40 | 57 | 47 | 47 | 47 | 47 | 47 |
| | Methacrylic acid units (%) | 3 | 3 | 3 | 3 | 3 | 6 | 3 | 3 | 3 | 3 |
| Shape | | Particle shape | Particle shape | Particle shape | Particle shape | Particle shape | Particle shape | Particle shape | Particle shape | Particle shape | Particle shape |
| Water-soluble polymer | | | | | | | | | | | |
| Type of water-soluble polymer | | B1 | B1 | B1 | B1 | B1 | B1 | B2 | B3 | B4 | B5 |
| Composition | AMPS units (%) | 2.5 | 2.5 | 2.5 | 2.5 | 2.5 | 2.5 | 7 | — | — | 2.5 |
| | Styrene sulfonic acid units (%) | — | — | — | — | — | — | — | 2.5 | — | — |
| | 4-sulfobutyl methacrylate units (%) | — | — | — | — | — | — | — | — | 2.5 | — |
| | Methacrylic acid units (%) | 30 | 30 | 30 | 30 | 30 | 30 | 30 | 30 | 30 | — |
| | Acrylic acid units (%) | — | — | — | — | — | — | — | — | — | 30 |
| | Ethyl acrylate (%) | 35 | 35 | 35 | 35 | 35 | 35 | 33 | 35 | 35 | 35 |
| | Butyl acrylate (%) | 32.5 | 32.5 | 32.5 | 32.5 | 32.5 | 32.5 | 30 | 32.5 | 32.5 | 32.5 |
| Glass transition temperature | (°C.) | 38 | 38 | 38 | 38 | 38 | 38 | 45 | 58 | 55 | 38 |
| Weight average molecular weight | | 25000 | 25000 | 25000 | 25000 | 25000 | 25000 | 50000 | 70000 | 40000 | 25000 |
| Method of formation of negative electrode active material layer | | Powder shaping | Powder shaping | Powder shaping | Powder shaping | Powder shaping | Powder shaping | Powder shaping | Powder shaping | Powder shaping | Powder shaping |
| Evaluation | | | | | | | | | | | |
| Fluidity of composite particles for negative electrode | | A | A | B | B | B | B | A | A | A | B |
| Peel strength of negative electrode | | A | A | A | A | A | A | B | B | B | A |
| Internal resistance | | A | A | A | A | A | A | B | B | B | A |
| High temperature storage characteristics | | A | A | A | A | B | A | A | A | A | A |

TABLE 4

|  |  | Examples | | | | | Comparative Examples | | |
|---|---|---|---|---|---|---|---|---|---|
|  |  | 2-11 | 2-12 | 2-13 | 2-14 | 2-15 | 2-1 | 2-2 | 2-3 |
| Composition of composite particles for negative electrode | | | | | | | | | |
| Negative electrode active material | (part) | 100 | 100 | 100 | 100 | 100 | 100 | 100 | 100 |
| Non-water soluble particle-shaped polymer | (part) | 2.55 | 2.79 | 4.15 | 0.9 | 2.7 | 2.7 | 2.7 | — |
| Water-soluble polymer | (part) | 0.45 | 0.21 | 0.45 | 0.1 | 0.3 | 0.3 | 0.3 | 0.3 |
| Negative electrode active material | | | | | | | | | |
| Shape | | Flake shape | Flake shape | Flake shape | Flake shape | Flake shape | Flake shape | Flake shape | Flake shape |
| Length of long axis L1 | (μm) | 3.5 | 3.5 | 3.5 | 3.5 | 3.5 | 3.5 | 3.5 | 3.5 |
| Ratio (L2/t) of length of short axis L2 and thickness "t" | | 15 | 15 | 15 | 15 | 15 | 15 | 15 | 15 |
| Non-water soluble particle-shaped polymer | | | | | | | | | |
| Type of non-water soluble particle-shaped polymer | | A1 | A1 | A1 | A1 | A1 | A1 | A1 | — |
| Composition | Styrene units (%) | 50 | 50 | 50 | 50 | 50 | 50 | 50 | — |
| | 1,3-butadiene units (%) | 47 | 47 | 47 | 47 | 47 | 47 | 47 | — |
| | Methacrylic acid units (%) | 3 | 3 | 3 | 3 | 3 | 3 | 3 | — |
| Shape | | Particle shape | Particle shape | Particle shape | Particle shape | Particle shape | Particle shape | Particle shape | — |
| Water-soluble polymer | | | | | | | | | |
| Type of water-soluble polymer | | B1 | B1 | B1 | B1 | B6 | Carboxy-methyl-cellulose | B1 | B1 |
| Composition | AMPS units (%) | 2.5 | 2.5 | 2.5 | 2.5 | 32.5 | | 2.5 | 2.5 |
| | Styrene sulfonic acid units (%) | — | — | — | — | — | | — | — |
| | 4-sulfobutyl methacrylate units (%) | — | — | — | — | — | | — | — |
| | Methacrylic acid units (%) | 30 | 30 | 30 | 30 | — | | 30 | 30 |
| | Acrylic acid units (%) | — | — | — | — | — | | — | — |

TABLE 4-continued

|  |  | Examples | | | | | Comparative Examples | | |
| --- | --- | --- | --- | --- | --- | --- | --- | --- | --- |
|  |  | 2-11 | 2-12 | 2-13 | 2-14 | 2-15 | 2-1 | 2-2 | 2-3 |
| Ethyl acrylate | (%) | 35 | 35 | 35 | 35 | 35 |  | 35 | 35 |
| Butyl acrylate | (%) | 32.5 | 32.5 | 32.5 | 32.5 | 32.5 |  | 32.5 | 32.5 |
| Glass transition temperature | (° C.) | 38 | 38 | 38 | 38 | 38 |  | 38 | 38 |
| Weight average molecular weight |  | 25000 | 25000 | 25000 | 25000 | 25000 |  | 25000 | 25000 |
| Method of formation of negative electrode active material layer |  | Powder shaping | Powder shaping Evaluation | Powder shaping | Powder shaping | Powder shaping | Powder shaping | coating shaping | Powder shaping |
| Fluidity of composite particles for negative electrode |  | A | B | B | A | A | B | — | Shaping not possible |
| Peel strength of negative electrode |  | B | A | A | B | B | D | C |  |
| Internal resistance |  | B | A | A | B | B | D | D |  |
| High temperature storage characteristics |  | A | B | B | B | A | B | C |  |

As shown in Tables 3 and 4, each sample of the composite particles for electrode which contain a flake-shaped electrode active material, a non-water soluable polymer, and a water-soluable polymer having a sulfonic acid group was high in fluidity. Further, the electrode which was obtained using such composite particles for electrode was high in peel strength. Furthermore, when made into a cell, the internal resistance was low and the high temperature storage characteristics was excellent (Examples 2-1 to 2-15).

On the other hand, when using carboxymethylcellulose instead of the water-soluble polymer having a sulfonic acid group, the peel strength when made into a negative electrode and the internal resistance when made into a cell were inferior (Comparative Example 2-1).

Further, when, instead of obtaining composite particles for negative electrode use and shaping the obtained composite particles for negative electrode use in the powder state, coating a slurry which contains a flake-shaped negative electrode active material, a non-water soluble polymer, and a water-soluble polymer having a sulfonic acid group as it is on a current collector to obtain a negative electrode, the obtained negative electrode was low in peel strength and, furthermore, was inferior in internal resistance and high temperature storage characteristics when made into a cell (Comparative Example 2-2).

Further, when not using a non-water soluble polymer, it was not possible to obtain a shaped article enabling the various evaluations to be performed (Comparative Example 2-3).

Method of Evaluation and Evaluation Criteria in Examples 3-1 to 3-9 and Comparative Examples 3-1 to 3-3

The various characteristics of Examples 3-1 to 3-9 and Comparative Examples 3-1 to 3-3 were tested by the following methods and evaluated by the following criteria.

<Corrosion Inhibiting Effect>

The slurry for composite particles which was obtained in each of Examples 3-1 to 3-9 and Comparative Examples 3-1 to 3-3 was coated on a thickness 20 μm aluminum foil current collector to give a dried film thickness of 70 μm or so and was dried at 50° C. for 20 minutes to obtain a sample for evaluation. Further, the obtained evaluation sample was examined visually over a 10 cm×10 cm range and the number of locations where 0.5 mm or more poor coating occurred was confirmed so as to evaluate the corrosion inhibiting effect. Note that, the corrosion inhibiting effect was evaluated by the following criteria. The greater the locations of occurrence of poor coating, the more advanced the corrosion and for this reason the less preferable it can be judged.

A: No locations of occurrence of poor coating, smooth overall
B: 1 to less than 5 locations of occurrence of poor coating
C: 5 to less than 10 locations of occurrence of poor coating
D: 10 or more locations of occurrence of poor coating <Peel Strength>

The positive electrode obtained in each of Examples 3-1 to 3-9 and Comparative Examples 3-1 to 3-3 was fastened with the positive electrode active material layer surface up, cellophane tape was adhered to the surface of the positive electrode active material layer, then the cellophane tape was peeled off from one end of the test piece by a speed of 50 mm/min in a 180° direction and the stress at that time was measured. Further, this measurement was performed 20 times and the average value was found. This was used as the peel strength and evaluated by the following criteria. Note that, the higher the peel strength, the higher the adhesion strength in the positive electrode active material layer and the adhesion strength of the positive electrode active material layer and current collector can be judged.

A: peel strength of 10 N/m or more
B: peel strength of less than 10 N/m to 5 N/m
C: peel strength of less than 5 N/m to 1 N/m
D: peel strength of less than 1 N/m <Initial Capacity>

The coin-type lithium secondary cell which was obtained in each of Examples 3-1 to 3-9 and Comparative Examples 3-1 to 3-3 was charged up to 4.3V at room temperature by the constant current method by a charging rate of 0.1 C, then was discharged down to 3.0V by a discharging rate of 0.1 C to find the cell capacity at the time of 0.1 C discharge. Further, from the obtained cell capacity, the capacity per unit weight of the positive electrode active material layer was calculated. This was used as the initial capacity. The initial capacity was evaluated in accordance with the following criteria. The higher the initial capacity, the higher the cell capacity of the secondary cell, so this is preferable.

A: 170 mAh/g or more
B: 150 mAh/g to less than 170 mAh/g
C: 130 mAh/g to less than 150 mAh/g
D: 100 mAh/g to less than 130 mAh/g
E: less than 100 mAh/g <Internal Resistance>

The coin-type lithium secondary cell which was obtained in each of Examples 3-1 to 3-9 and Comparative Examples 3-1 to 3-3 was charged up to 4.2V at room temperature by the constant current method by a charging rate of 0.1 C, then discharged under a −30° C. environment by a constant current of 1 C and measured for the amount of voltage drop (ΔV) 10 seconds after the start of discharged to evaluate the internal resistance. The smaller the value of the amount of voltage drop 10 seconds after the start of discharge, the smaller the internal resistance and the more possible high speed charging and discharging can be judged.

A: voltage drop of less than 0.2V
B: voltage drop of 0.2V to less than 0.3V
C: voltage drop of 0.3V to less than 0.5V
D: voltage drop of 0.5V to less than 0.7V
E: voltage drop of 0.7V or more <High Temperature Storage Characteristics>

The coin-type lithium secondary cell which was obtained in each of Examples 3-1 to 3-9 and Comparative Examples 3-1 to 3-3 was charged up to 4.25V at room temperature by the constant current method by a charging rate of 0.2 C, then was discharged down to 3.0V by a discharging rate of 0.2 C so as to measure the initial capacity $C_0$ at the time of 0.2 C discharge. Next, the cell was charged up to 4.25V by the constant current method by a charging rate of 0.2 C, was stored at 60° C. for 7 days, then was charged and discharged by a discharge voltage 3.0V and a charging/discharging rate of 0.2 C so as to measure the capacity $C_1$ after high temperature storage. Further, a similar test was run on 10 cells. From the initial capacity $C_0$ and the capacity $C_1$ after high temperature storage of the 10 cells, the capacity retention rate was calculated in accordance with $\Delta C = C_1/C_0 \times 100$ (%). The average value $\Delta C_{ave}$ of the capacity retention rate of the 10 cells was found and the following criteria were used to evaluate high temperature storage characteristics. The higher the value of the average value $\Delta C_{ave}$ of the capacity maintenance rate, the better the high temperature storage characteristics can be judged.

A: $\Delta C_{ave}$ of 95% or more
B: $\Delta C_{ave}$ of 85% to less than 95%
C: $\Delta C_{ave}$ of 70% to less than 85%
D: $\Delta C_{ave}$ of 60% to less than 70%
E: $\Delta C_{ave}$ of less than 60%

<High Temperature Cycle Characteristics>

The coin-type lithium secondary cell (half cell) which was obtained in each of Examples 3-1 to 3-9 and Comparative Examples 3-1 to 3-3 was charged up to 4.3V under conditions of a temperature of 60° C. by the constant current method using a charging rate of 0.1 C, then was discharged down to 3.0V by a discharging rate of 0.1 C in a charging/discharging test. This was repeated 100 times. Further, the ratio between the discharge capacity $Cap_{1st}$ it at the first charging/discharging test and the discharge capacity $Cap_{100th}$ at the 100th charging/discharging test (($Cap_{100th}/Cap_{1st}$)×100%) was found as the 100 cycle capacity retention rate. Further, the obtained 100 cycle capacity retention rate was used as a basis to evaluate the high temperature cycle characteristics by the following criteria. Note that, the higher the 100 cycle capacity retention rate, the smaller the deterioration at the 100th cycle at the time of performing a cycle test at a high temperature and the better the high temperature cycle characteristics that can be judged, so this is preferable.

A: 100 cycle capacity retention rate of 95% or more
B: 100 cycle capacity retention rate of 85% to less than 95%
C: 100 cycle capacity retention rate of 75% to less than 85%
D: 100 cycle capacity retention rate of 60% to less than 75%
E: 100 cycle capacity retention rate of less than 60%

Example 3-1

Production of Slurry for Composite Particles

A positive electrode active material constitute by $LiNiO_2$ 100 parts, a conductive material constituted by acetylene black (HS-100: made by DENKA) 2 parts, a non-water soluble particle-shaped polymer (A1) which was obtained at Production Example 1, 1.8 parts converted to solid content, and a water-soluble polymer having a sulfonic acid group (B1) which was obtained by Production Example 6, 0.7 part converted to solid content were mixed, ion exchanged water was added in a suitable quantity, and the result was mixed and dispersed by a planetary mixer to obtain a slurry for composite particles. Note that, the obtained slurry for composite particles had a pH of 10.8.

Production of Composite Particles for Positive Electrode

The above obtained slurry for composite particles was granulated by spray drying using a spray dryer (made by Ohkawara Kakohki) and using a rotary disk type atomizer (diameter 65 mm) at a speed of 25,000 rpm, hot air temperature of 150° C., and particle recovery outlet temperature of 90° C. to obtain composite particles for positive electrode. The obtained composite particles had an average volume particle size of 30 μm.

Production of Positive Electrode

The above obtained composite particles for positive electrode were supplied on a roll of a roll press (rough surface hot roll, made by Hirano Gikenkogyo) (roll temperature 100° C., press linear pressure 4.0 kN/cm) together with a current collector constituted by aluminum foil and was formed in a sheet shape by a shaping speed of 15 m/min on the current collector constituted by aluminum foil to obtain a positive electrode which has an electrode density 4.5 g/cm³, thickness 65 μm positive electrode active material layer.

Production of Lithium Secondary Cell

The above obtained positive electrode was punched into a disk shape of a diameter of 16 mm. On the positive electrode active material layer surface side of this positive electrode, a diameter 18 mm, thickness 25 μm disk-shaped separator comprised of a polypropylene porous film, a counter electrode constituted by metal lithium, and an expander metal were stacked in that order. The assembly was placed in a stainless steel coin-shaped outer container (diameter 20 mm, height 1.8 mm, stainless steel thickness 0.25 mm) set with a polypropylene packing. Next, into this container, an electrolytic solution (solvent: ethylene carbonate/diethyl carbonate=1/2 (volume ratio at 20° C.), electrolyte: 1M $LiPF_6$) was poured so as not to leave any air, a thickness 0.2 mm stainless steel cap was placed over the outer container and fastened through a polypropylene packing, and the battery case was sealed so as to produce a diameter 20 mm, thickness approximately 2 mm coin type lithium secondary cell (half cell).

Further, the above obtained slurry for composite particles was used to evaluate the corrosion inhibiting effect, the positive electrode was used to evaluate the peel strength, and the lithium secondary cell was used to evaluate the initial capacity, internal resistance, high temperature storage characteristics, and high temperature cycle characteristics. The results are shown in Table 5.

Example 3-2

Except for using as the positive electrode active material, instead of LiNiO$_2$, LiNi$_{0.6}$Mn$_{0.2}$Co$_{0.2}$O$_2$, the same procedure was followed as in Example 3-1 to produce a slurry for composite particles, composite particles for positive electrode, positive electrode, and lithium secondary cell and similarly evaluate them. The results are shown in Table 5.

Examples 3-3 to 3-6

Except for using, instead of the water-soluble polymer having a sulfonic acid group (B1), the water-soluble polymer having a sulfonic acid group (B5) which was obtained in Production Example 10 (Example 3-3), the water-soluble polymer having a sulfonic acid group (B9) which was obtained in Production Example 14 (Example 3-4), the water-soluble polymer having a sulfonic acid group (B10) which was obtained in Production Example 15 (Example 3-5), and the water-soluble polymer having a sulfonic acid group (B3) which was obtained in Production Example 8 (Example 3-6), the same procedure was followed as in Example 3-1 to produce a slurry for composite particles, composite particles for positive electrode, positive electrode, and lithium secondary cell and similarly evaluate them. The results are shown in Table 5.

Examples 3-7 and 3-8

Except for changing the amount of the water-soluble polymer having a sulfonic acid group (B1), converted to solid content, to 1.6 parts (Example 3-7) and 0.08 part (Example 3-8), the same procedure was followed as in Example 3-1 to produce a slurry for composite particles, composite particles for positive electrode, positive electrode, and lithium secondary cell and similarly evaluate them. The results are shown in Table 5.

Example 3-9

Except for using, instead of the water-soluble polymer having a sulfonic acid group (B1), the water-soluble polymer having a sulfonic acid group (B2) which was obtained in Production Example 7, the same procedure was followed as in Example 3-1 to produce a slurry for composite particles, composite particles for positive electrode, positive electrode, and lithium secondary cell and similarly evaluate them. The results are shown in Table 5.

Comparative Example 3-1

Except for using, instead of the water-soluble polymer having a sulfonic acid group (B1), carboxymethylcellulose, the same procedure was followed as in Example 3-1 to produce a slurry for composite particles, then produce composite particles for positive electrode, whereupon the shapeability was extremely inferior and could not be obtained.

Comparative Example 3-2

Except for not including the non-water soluble particle-shaped polymer (A1), the same procedure was followed as in Example 3-1 to produce a slurry for composite particles, then produce composite particles for positive electrode, whereupon the shapeability was extremely inferior and composite particles for positive electrode use could not be obtained.

Comparative Example 3-3

Except for not including the water-soluble polymer having a sulfonic acid group (B1), the same procedure was followed as in Example 3-1 to produce a slurry for composite particles, composite particles for positive electrode, positive electrode, and lithium secondary cell and similarly evaluate them. The results are shown in Table 5.

TABLE 5

| | | | | | Examples | | | |
|---|---|---|---|---|---|---|---|---|
| | | | 3-1 | 3-2 | 3-3 | 3-4 | 3-5 | 3-6 | 3-7 |

| Composition of composite particles for positive electrode | | | | | | | | |
|---|---|---|---|---|---|---|---|---|
| LiNiO$_2$ | (part) | 100 | — | 100 | 100 | 100 | 100 | 100 |
| LiNi$_{0.6}$Mn$_{0.2}$Co$_{0.2}$O$_2$ | (part) | — | 100 | — | — | — | — | — |
| Non-water soluble particle-shaped polymer | (part) | 1.8 | 1.8 | 1.8 | 1.8 | 1.8 | 1.8 | 1.8 |
| Water-soluble polymer | (part) | 0.7 | 0.7 | 0.7 | 0.7 | 0.7 | 0.7 | 1.6 |

| Non-water soluble particle-shaped polymer | | | | | | | | |
|---|---|---|---|---|---|---|---|---|
| Type of non-water soluble particle-shaped polymer | | A1 | A1 | A1 | A1 | A1 | A1 | A1 |
| Composition | 2-ethylhexyl acrylate units | (%) | 77.75 | 77.75 | 77.75 | 77.75 | 77.75 | 77.75 | 77.75 |
| | Acrylonitrile units | (%) | 20.25 | 20.25 | 20.25 | 20.25 | 20.25 | 20.25 | 20.25 |
| | Methacrylic acid units | (%) | 2 | 2 | 2 | 2 | 2 | 2 | 2 |
| Average particle size | (nm) | 100 | 100 | 100 | 100 | 100 | 100 | 100 |

| Water-soluble polymer | | | | | | | | |
|---|---|---|---|---|---|---|---|---|
| Type of water-soluble polymer | | B1 | B1 | B5 | B9 | B10 | B3 | B1 |
| Composition | AMPS units | (%) | 2.5 | 2.5 | 2.5 | 10 | 1 | — | 2.5 |
| | Styrene sulfonic acid units | (%) | — | — | — | — | — | 2.5 | — |
| | Methacrylic acid units | (%) | 32 | 30 | — | 60 | 64 | 30 | 30 |
| | Acrylic acid units | (%) | — | — | 30 | — | — | — | — |
| | Ethyl acrylate | (%) | 35 | 35 | 35 | 16 | 18 | 35 | 35 |
| | Butyl acrylate | (%) | 32.5 | 32.5 | 32.5 | 14 | 17 | 32.5 | 32.5 |
| Weight average molecular weight | | 25000 | 25000 | 25000 | 30000 | 50000 | 70000 | 25000 |
| pH of slurry for composite particle | | 10.8 | 10.8 | 10 | 9.5 | 9 | 10 | 10 |
| Method of formation of positive electrode active material layer | | Powder shaping | Powder shaping | Powder shaping | Powder shaping | Powder shaping | Powder shaping | Powder shaping |

TABLE 5-continued

| | | | | | | | | |
|---|---|---|---|---|---|---|---|---|
| Average particle size of composite particles for positive electrode | (μm) | 30 | 30 | 30 | 30 | 30 | 30 | 30 |

Evaluation

| | | | | | | | |
|---|---|---|---|---|---|---|---|
| Corrosion inhibiting effect | A | A | B | A | A | B | A |
| Peel strength of positive electrode | A | A | B | B | C | C | C |
| Initial capacity | A | B | A | A | A | A | A |
| High temperature storage characteristics | A | B | B | B | B | B | B |
| Internal resistance | A | A | B | B | B | B | B |
| High temperature cycle characteristics | A | B | B | B | C | B | B |

| | | Examples | | Comparative Examples | | |
|---|---|---|---|---|---|---|
| | | 3-8 | 3-9 | 3-1 | 3-2 | 3-3 |

Composition of composite particles for positive electrode

| | | | | | | |
|---|---|---|---|---|---|---|
| $LiNiO_2$ | (part) | 100 | 100 | 100 | 100 | 100 |
| $LiNi_{0.6}Mn_{0.2}Co_{0.2}O_2$ | (part) | — | — | — | — | — |
| Non-water soluble particle-shaped polymer | (part) | 1.8 | 1.8 | 1.8 | — | 1.8 |
| Water-soluble polymer | (part) | 0.08 | 0.7 | 0.7 | 0.7 | — |

Non-water soluble particle-shaped polymer

| | | | | | | | |
|---|---|---|---|---|---|---|---|
| Type of non-water soluble particle-shaped polymer | | | A1 | A1 | A1 | — | A1 |
| Compo- | 2-ethylhexyl acrylate units | (%) | 77.75 | 77.75 | 77.75 | — | 77.75 |
| sition | Acrylonitrile units | (%) | 20.25 | 20.25 | 20.25 | — | 20.25 |
| | Methacrylic acid units | (%) | 2 | 2 | 2 | — | 2 |
| Average particle size | | (nm) | 100 | 100 | 100 | — | 100 |

Water-soluble polymer

| | | | | | | | |
|---|---|---|---|---|---|---|---|
| Type of water-soluble polymer | | | B1 | B2 | Carboxy-methyl-cellulose | B1 | — |
| Compo- | AMPS units | (%) | 2.5 | 7 | | 2.5 | — |
| sition | Styrene sulfonic acid units | (%) | — | — | | — | — |
| | Methacrylic acid units | (%) | 30 | 30 | | 30 | — |
| | Acrylic acid units | (%) | — | — | | — | — |
| | Ethyl acrylate | (%) | 35 | 33 | | 35 | — |
| | Butyl acrylate | (%) | 32.5 | 30 | | 32.5 | — |
| Weight average molecular weight | | | 25000 | 50000 | | 25000 | — |
| pH of slurry for composite particle | | | 13 | 10 | 14 | 13 | 14 |
| Method of formation of positive electrode active material layer | | | Powder shaping | Powder shaping | Powder shaping | Powder shaping | Powder shaping |
| Average particle size of composite particles for positive electrode | | (μm) | 30 | 30 | 30 | 30 | 30 |

Evaluation

| | | | | | |
|---|---|---|---|---|---|
| Corrosion inhibiting effect | B | A | Shaping not possible | Shaping not possible | D |
| Peel strength of positive electrode | C | B | | | D |
| Initial capacity | A | A | | | A |
| High temperature storage characteristics | B | B | | | E |
| Internal resistance | C | B | | | E |
| High temperature cycle characteristics | B | B | | | E |

As shown in Table 5, the slurries for composite particles which comprise a positive electrode active material, non-water soluble particle-shaped polymer, and water-soluble polymer having a sulfonic acid group which are dispersed in water all suppress corrosion with respect to metal and, further, the composite particles for positive electrode which are obtained by using the slurries for composite particles are high in peel strength when shaped to obtain positive electrodes and, furthermore, excellent in initial capacity, high temperature storage characteristics, internal resistance, and high temperature cycle characteristics when made into cells (Examples 3-1 to 3-9).

On the other hand, when using carboxymethylcellulose instead of the water-soluble polymer having a sulfonic acid group and when not including the non-water soluble particle-shaped polymer, it was not possible to obtain a shaped article enabling the various evaluations to be performed (Comparative Examples 3-1 and 3-2).

Furthermore, when the water-soluble polymer having a sulfonic acid group was not included, when made into a slurry for composite particles, the corrosiveness to metal was high, further, the peel strength when shaped to form a positive electrode was inferior and, furthermore, a high temperature storage characteristics, internal resistance, and high temperature cycle characteristics when made into a battery were inferior (Comparative Example 3-3).

The invention claimed is:

1. Composite particles for electrochemical device electrode containing:
   an electrode active material;
   a non-water soluble particle-shaped polymer; and
   a water-soluble polymer having a sulfonic acid group, said water-soluble polymer containing monomer units which contain sulfonic acid groups, monomer units which contain carboxyl groups, and (meth)acrylic acid ester monomer units, wherein:
   a ratio of a content of the monomer units which contain sulfonic acid groups in said water-soluble polymer is 2 to 8 wt %,
   a ratio of a content of the monomer units which contain carboxyl groups in said water-soluble polymer is 20 to 60 wt %, and a ratio of a content of the (meth)acrylic acid ester monomer units in said water-soluble polymer is 25 to 78 wt %.

2. The composite particles for electrochemical device electrode as set forth in claim 1, wherein said electrode active material is a positive electrode active material which contains nickel.

3. The composite particles for electrochemical device electrode as set forth in claim 1, wherein said electrode active material is a flake-shaped electrode active material.

4. A material for electrochemical device electrode including the composite particles for electrochemical device electrode as set forth in claim 1.

5. An electrochemical device electrode comprising an electrode active material layer which is formed by using the material for electrochemical device electrode as set forth in claim 4 laminated on a current collector.

6. The electrochemical device electrode as set forth in claim 5, wherein said electrode active material layer is laminated on said current collector by press forming.

7. The electrochemical device electrode as set forth in claim 6, wherein said electrode active material layer is laminated on said current collector by roll press forming.

8. The composite particles for electrochemical device electrode as set forth in claim 1, wherein:
said non-water soluble particle-shaped polymer is a diene-based polymer containing conjugated diene monomer units, ethylenically unsaturated carboxylic acid monomer units, and other monomer units which are copolymerizable with the conjugated diene monomer units, and the ethylenically unsaturated carboxylic acid monomer units,
a ratio of a content of the conjugated diene monomer units in the diene-based polymer is 20 to 60 wt %,
a ratio of a content of the ethylenically unsaturated carboxylic acid monomer units in the diene-based polymer is 0.5 to 10 wt %, and
a ratio of a content of the other monomer units in the diene-based polymer is 30 to 79.5 wt %.

9. The composite particles for electrochemical device electrode as set forth in claim 1, wherein:
said non-water soluble particle-shaped polymer is an acrylate-based polymer containing (meth)acrylic acid ester monomer units, $\alpha,\beta$-unsaturated nitrile monomer units, and vinyl monomer units which have an acid ingredient,
a ratio of a content of the (meth)acrylic acid ester monomer units in the acrylate-based polymer is 50 to 95 wt %,
a ratio of a content of the $\alpha,\beta$-unsaturated nitrile monomer units in the acrylate-based polymer is 3 to 40 wt %, and
a ratio of a content of the vinyl monomer units in the acrylate-based polymer is 1.0 to 7.0 wt %.

10. The composite particles for electrochemical device electrode as set forth in claim 1, wherein said water-soluble polymer has a glass transition temperature of 0 to 70° C.

11. The composite particles for electrochemical device electrode as set forth in claim 1, wherein:
said electrode active material is a positive electrode active material, and
a ratio of said non-water soluble particle-shaped polymer and said water-soluble polymer is, by weight ratio of the non-water soluble particle-shaped polymer/water-soluble polymer, 70/30 to 90/10.

12. The composite particles for electrochemical device electrode as set forth in claim 1, wherein:
said electrode active material is a negative electrode active material, and
a ratio of said non-water soluble particle-shaped polymer and said water-soluble polymer is, by weight ratio of the non-water soluble particle-shaped polymer/water-soluble polymer, 80/20 to 99.1/0.1.

13. A method of production of the composite particles for electrochemical device electrode as set forth in claim 1, comprising a step of making said electrode active material, said non-water soluble particle-shaped polymer, and said water-soluble polymer disperse in water to obtain a slurry and a step of spraying and drying said slurry to form granules.

* * * * *